(12) United States Patent
Amiri et al.

(10) Patent No.: US 12,701,538 B2
(45) Date of Patent: Aug. 4, 2026

(54) LOS PROBABILITY MAP SIGNALING

(71) Applicant: QUALCOMM Incorporated, San Diego, CA (US)

(72) Inventors: Roohollah Amiri, San Diego, CA (US); Srinivas Yerramalli, San Diego, CA (US); Taesang Yoo, San Diego, CA (US); Marwen Zorgui, San Diego, CA (US); Mohammad Tarek Fahim, San Diego, CA (US); Mohammed Ali Mohammed Hirzallah, San Diego, CA (US); Rajat Prakash, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 843 days.

(21) Appl. No.: 17/819,589

(22) Filed: Aug. 12, 2022

(65) Prior Publication Data

US 2024/0057018 A1 Feb. 15, 2024

(51) Int. Cl.
*H04W 64/00* (2009.01)
*G01S 19/48* (2010.01)

(52) U.S. Cl.
CPC ........... *H04W 64/003* (2013.01); *G01S 19/48* (2013.01)

(58) Field of Classification Search
CPC ...... G01S 19/48; H04W 64/00; H04W 64/003
USPC ...... 370/328, 329, 330; 455/456, 456.3, 457
See application file for complete search history.

(56) References Cited

U.S. PATENT DOCUMENTS

| | | | | |
|---|---|---|---|---|
| 11,451,926 | B2 * | 9/2022 | Edge ...................... | H04W 16/28 |
| 12,101,775 | B2 * | 9/2024 | Uzeda Garcia ....... | H04W 72/21 |
| 2017/0251055 | A1 * | 8/2017 | Edge ................... | H04W 64/003 |
| 2017/0255360 | A1 | 9/2017 | Hsieh et al. | |
| 2017/0359739 | A1 * | 12/2017 | Reed ...................... | H04W 24/06 |
| 2021/0058970 | A1 * | 2/2021 | Kwak ................... | H04W 72/23 |
| 2022/0113364 | A1 | 4/2022 | Zhou et al. | |
| 2022/0229143 | A1 * | 7/2022 | Dwivedi ............... | G01S 5/0236 |

(Continued)

FOREIGN PATENT DOCUMENTS

WO WO-2022133416 A1 * 6/2022 ............. H04W 4/06

OTHER PUBLICATIONS

Intel Corporation: "Solutions for Mitigation of NLOS Problem for NR Positioning", 3GPP TSG RAN WG1 #106b-e, R1-2109615, 3rd Generation Partnership Project, Mobile Competence Centre, 650, Route Des Lucioles, F-06921 Sophia-Antipolis Cedex, France, vol. RAN WG1, No. e-Meeting, Oct. 11-Oct. 19, 2021, Oct. 2, 2021, XP052058558, pp. 1-12, Chapter 2.1 LOS/NLOS Indicator.

(Continued)

*Primary Examiner* — David Q Nguyen
(74) *Attorney, Agent, or Firm* — Weaver Austin Villenueve & Sampson LLP

(57) ABSTRACT

Techniques for line-of-sight (LOS) probability map signaling are disclosed. The techniques can include receiving a positioning signal via a wireless link between the UE and a transmission/reception point (TRP) of a radio access network (RAN), identifying an LOS probability function associated with the wireless link based on LOS probability map information provided by a location management function (LMF) of a core network for the RAN, and generating an LOS probability estimate for the wireless link using the LOS probability function.

20 Claims, 14 Drawing Sheets

(56)　　　　References Cited

U.S. PATENT DOCUMENTS

| 2022/0312153 A1* | 9/2022 | Manolakos | H04W 64/00 |
| 2023/0308833 A1* | 9/2023 | Yang | G01S 1/042 |
| 2024/0172168 A1* | 5/2024 | Bao | G01S 5/0036 |
| 2024/0397470 A1* | 11/2024 | Hu | G01S 5/0205 |
| 2025/0008473 A1* | 1/2025 | Hu | H04L 5/0051 |

OTHER PUBLICATIONS

Partial International Search Report—PCT/US2023/023706—ISA/EPO—Oct. 23, 2023.

CMCC: "Discussion on other aspects on AI/ML for positioning accuracy enhancement", R1-2204300, 3rd Generation Partnership Project, Mobile Competence Centre, 650, Route Des Lucioles, F-06921 Sophia-Antipolis Cedex, France, vol. RAN WG1, No. e-Meeting, May 9-May 20, 2022, Apr. 29, 2022, XP052153464, 3 Pages, Chapter 3 Considerations on potential spec impact, table 1 figure 2a.

International Search Report and Written Opinion—PCT/US2023/023706—ISA/EPO—Jan. 30, 2024.

Nokia, et al., "Other aspects on AI/ML for positioning accuracy enhancement", R1-2204576, 3rd Generation Partnership Project, Mobile Competence Centre, 650, Route Des Lucioles, F-06921 Sophia-Antipolis Cedex, France, vol. RAN WG1, No. e-Meeting, May 9-May 20, 2022, Apr. 29, 2022, XP052153598, 7 Pages, Chapter 2.1.2.3 NLOS-based localization.

Qualcomm Incorporated: "Other Aspects on AI-ML for Positioning Accuracy Enhancement", 3GPP TSG RAN WG1 #109-e, R1-2205029, 3rd Generation Partnership Project, Mobile Competence Centre, 650, Route Des Lucioles, F-06921 Sophia-Antipolis Cedex, France, vol. RAN WG1, No. e-Meeting, May 9-May 20, 2022, Apr. 29, 2022, XP052144138, 16 pages, p. 10, lines 2-8, 11-13, 16, 19-21, 24-26, 28-29, 32-33, Par. 4.1, Par. 4.2, Par. 4.2.1, Par. 4.2.2, Par. 6.1, figure 1, Chapter 6.2 Assistance information for training and inference.

European Search Report—EP25221907—Search Authority—Munich—Feb. 26, 2026.

* cited by examiner

110

145-3

145-2

145-1

145

140

105

133

120

135

130

170

160

180

100

900

1010

Receive a positioning signal via a wireless link between a UE and a TRP of a RAN

1020

Identify an LOS probability function associated with the wireless link based on LOS probability map information provided by an LMF of a core network for the RAN

1030

Generate an LOS probability estimate for the wireless link using the LOS probability function

1200

1210

Determine, according to LOS probability model, LOS probability map parameters for LOS probability map region associated with TRP in RAN

1220

Send LOS probability map parameters to UE in RAN

1230

Receive, from UE, feedback associated with LOS probability map region

1240

Train LOS probability model based on feedback

LOS PROBABILITY MAP SIGNALING

BACKGROUND

1. Field of Disclosure

The present disclosure relates generally to the field of wireless communications, and more specifically to determining the location of a User Equipment (UE) using radio frequency (RF) signals.

2. Description of Related Art

In a radio access network (RAN), various positioning techniques can be used to determine the position of a mobile device (referred to herein as a UE). Some of these positioning techniques may involve determining the position of the UE based on times of flight (ToFs) of positioning signals that the UE receives from one or more transmission/reception points (TRPs) of the RAN. Assuming that a ToF of a given positioning signal received from a given TRP represents a time of flight for propagation of the signal from the TRP to the UE via a line-of-sight (LOS) path, a distance between the UE and the TRP can be accurately inferred based on that ToF.

BRIEF SUMMARY

An example method for wireless communication by a UE, according to this disclosure, may comprise receiving a positioning signal via a wireless link between the UE and a TRP of a RAN, identifying an LOS probability function associated with the wireless link based on LOS probability map information provided by an LMF of a core network for the RAN, and generating an LOS probability estimate for the wireless link using the LOS probability function.

An example UE, according to this disclosure, may comprise a transceiver, a memory, and one or more processors communicatively coupled with the transceiver and the memory, wherein the one or more processors are configured to receive a positioning signal via a wireless link between the UE and a TRP of a RAN, identify an LOS probability function associated with the wireless link based on LOS probability map information provided by an LMF of a core network for the RAN, and generate an LOS probability estimate for the wireless link using the LOS probability function.

An example method for communication by an LMF of a core network for a RAN, according to this disclosure, may comprise determining, according to an LOS probability model, LOS probability map parameters for an LOS probability map region associated with a TRP of the RAN, sending the LOS probability map parameters to a UE in the RAN, receiving, from the UE, feedback associated with the LOS probability map region, and training the LOS probability model based on the feedback.

An apparatus for an LMF of a core network for a RAN, according to this disclosure, may comprise at least one processor and at least one memory communicatively coupled with the at least one processor and storing processor-readable code that, when executed by the at least one processor, is configured to determine, according to an LOS probability model, LOS probability map parameters for an LOS probability map region associated with a TRP of the RAN, send the LOS probability map parameters to a UE in the RAN, receive, from the UE, feedback associated with the LOS probability map region, and train the LOS probability model based on the feedback.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

FIG. 1 is a simplified illustration of a positioning system 100 in which a UE 105, location server 160, and/or other components of the positioning system 100 can use the techniques provided herein for LOS probability map signaling, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the UE 105, such as infrared signals or other optical technologies.

Mobile devices 145 may comprise other UEs communicatively coupled with a cellular or other mobile network (e.g., network 170). When one or more other mobile devices 145 comprising UEs are used in the position determination of a particular UE 105, the UE 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and UE 105 may comprise sidelink and/or similar Device-to-Device (D2D) communication technologies. Sidelink, which is defined by 3GPP, is a form of D2D communication under the cellular-based LTE and NR standards.

According to some embodiments, such as when the UE 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
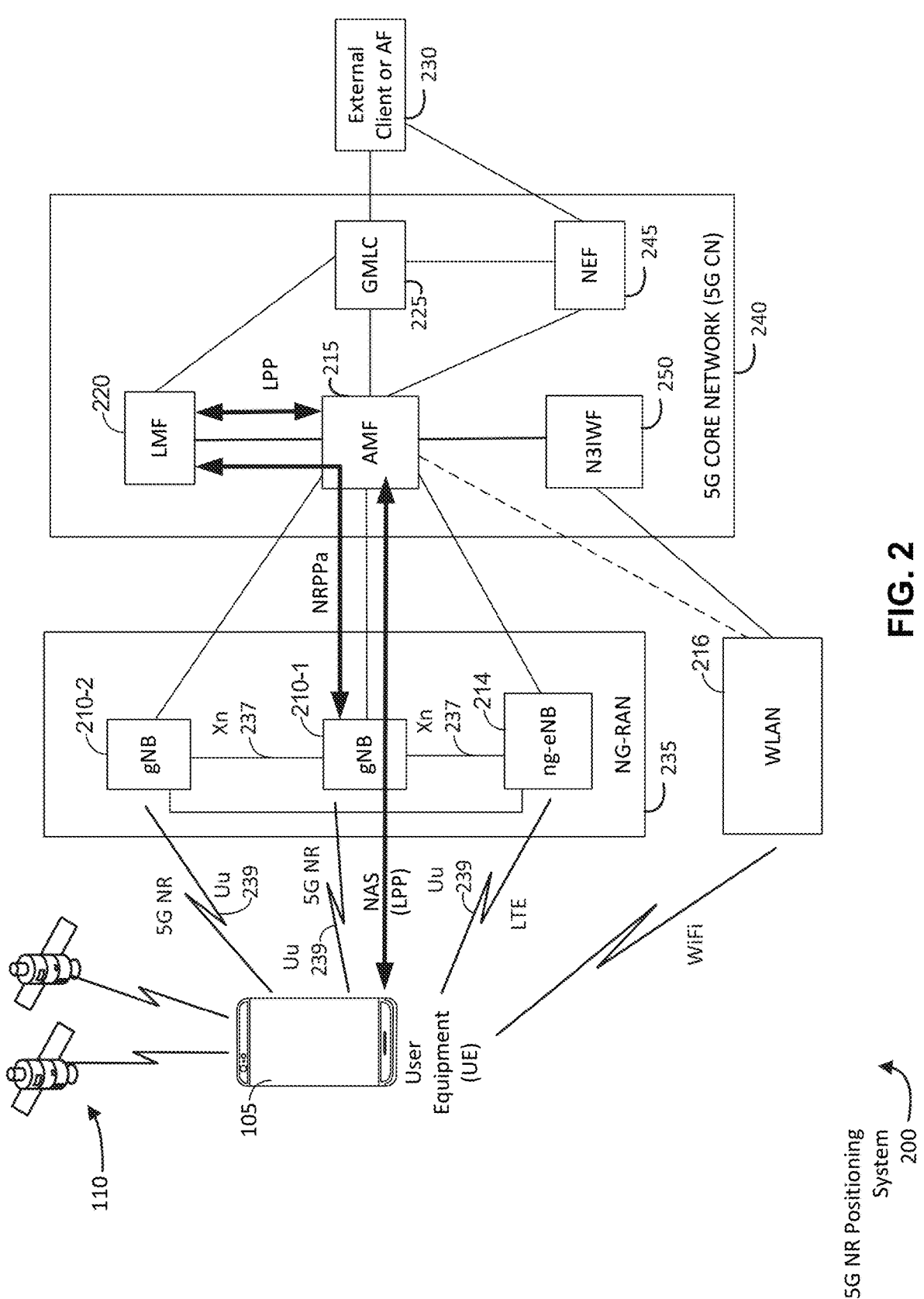
FIG. 2 is a diagram of a 5th Generation (5G) New Radio (NR) positioning system, illustrating an embodiment of a positioning system (e.g., the positioning system of FIG. 1) implemented within a 5G NR communication network.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
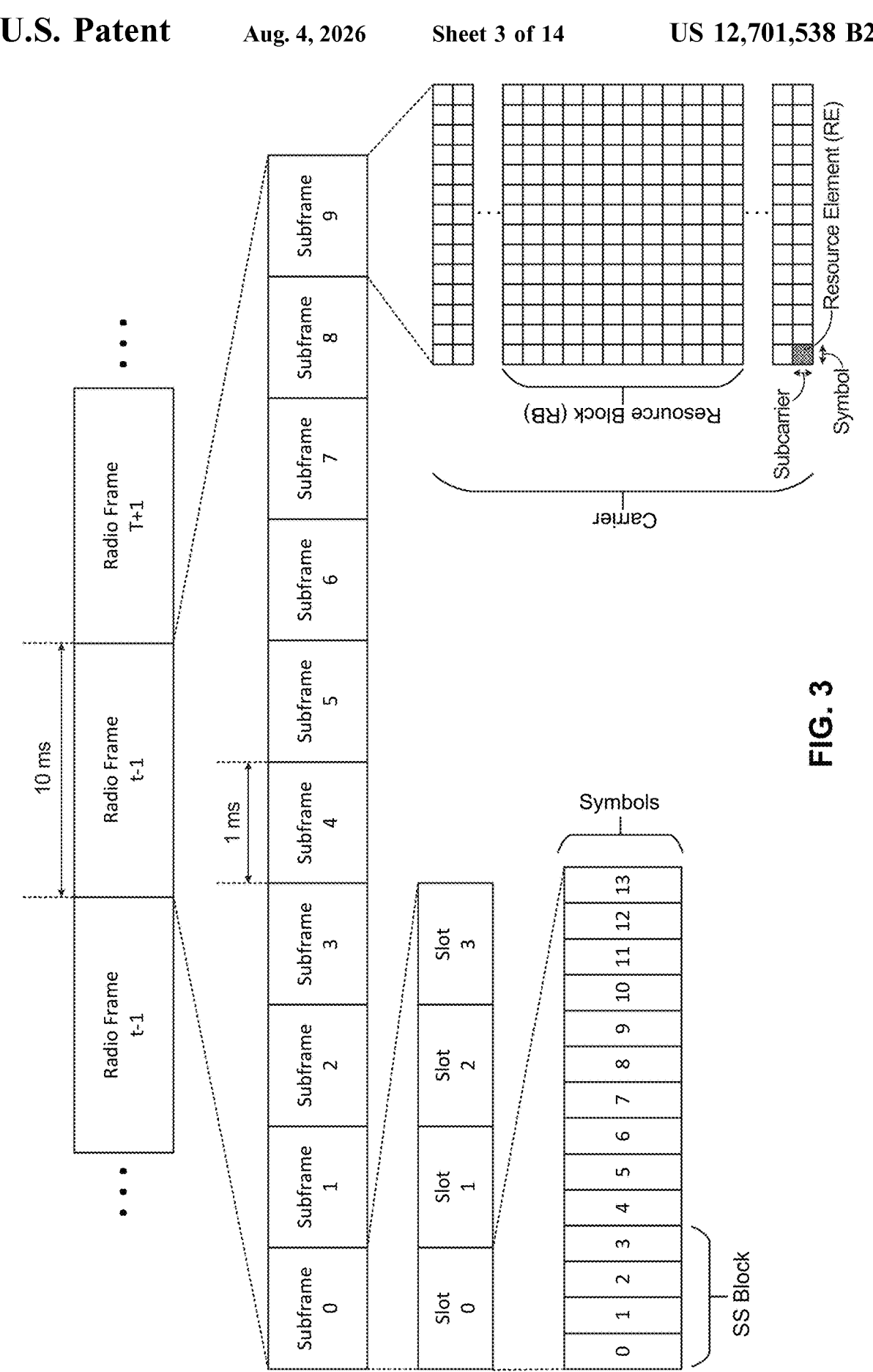
FIG. 3 is a diagram showing an example of a frame structure for NR and associated terminology.

FIG. 3 is a diagram showing an example of a frame structure for NR and associated terminology, which can serve as the basis for physical layer communication between the UE 105 and base stations/TRPs. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 3 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 3. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 4:
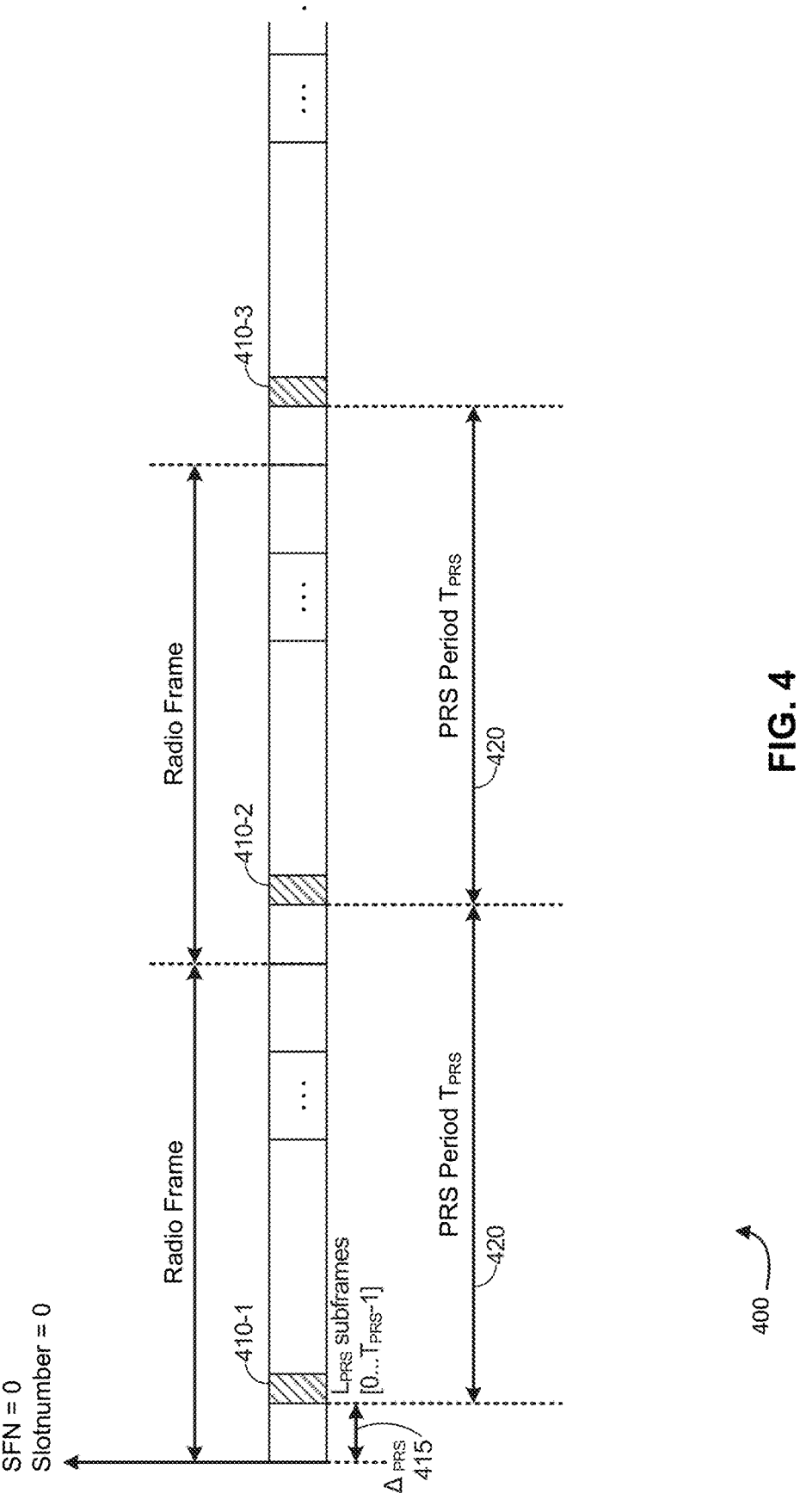
FIG. 4 is a diagram showing an example of a radio frame sequence with Positioning Reference Signal (PRS) positioning occasions.

FIG. 4 is a diagram showing an example of a radio frame sequence 400 with PRS positioning occasions. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance." Subframe sequence 400 may be applicable to broadcast of PRS signals (DL-PRS signals) from base stations 120 in positioning system 100. The radio frame sequence 400 may be used in 5G NR (e.g., in 5G NR positioning system 200) and/or in LTE. Similar to FIG. 3, time is represented horizontally (e.g., on an X axis) in FIG. 4, with time increasing from left to right. Frequency is represented vertically (e.g., on a Y axis) with frequency increasing (or decreasing) from bottom to top.

FIG. 4 shows how PRS positioning occasions 410-1, 410-2, and 410-3 (collectively and generically referred to herein as positioning occasions 410) are determined by a System Frame Number (SFN), a cell-specific subframe offset ($\Delta_{PRS}$) 415, a length or span of $L_{PRS}$ subframes, and the PRS Periodicity ($T_{PRS}$) 420. The cell-specific PRS subframe configuration may be defined by a "PRS Configuration Index," $I_{PRS}$, included in assistance data (e.g., TDOA assistance data), which may be defined by governing 3GPP standards. The cell-specific subframe offset ($\Delta_{PRS}$) 415 may be defined in terms of the number of subframes transmitted starting from System Frame Number (SFN) 0 to the start of the first (subsequent) PRS positioning occasion.

A PRS may be transmitted by wireless nodes (e.g., base stations 120) after appropriate configuration (e.g., by an Operations and Maintenance (O&M) server). A PRS may be transmitted in special positioning subframes or slots that are grouped into positioning occasions 410. For example, a PRS positioning occasion 410-1 can comprise a number $N_{PRS}$ of consecutive positioning subframes where the number $N_{PRS}$ may be between 1 and 160 (e.g., may include the values 1, 2, 4 and 6 as well as other values). PRS occasions 410 may be grouped into one or more PRS occasion groups. As noted, PRS positioning occasions 410 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some embodiments, $T_{PRS}$ may be measured in terms of the number of subframes between the start of consecutive positioning occasions.

In some embodiments, when a UE 105 receives a PRS configuration index $I_{PRS}$ in the assistance data for a particular cell (e.g., base station), the UE 105 may determine the PRS periodicity $T_{PRS}$ 420 and cell-specific subframe offset ($\Delta_{PRS}$) 415 using stored indexed data. The UE 105 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 415) relative to other cells in the network that use a different frequency. In SFN-synchronous networks all wireless nodes (e.g., base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 105 may determine the timing of the PRS occasions 410 of the reference and neighbor cells for TDOA positioning, if the UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

Figure 5:
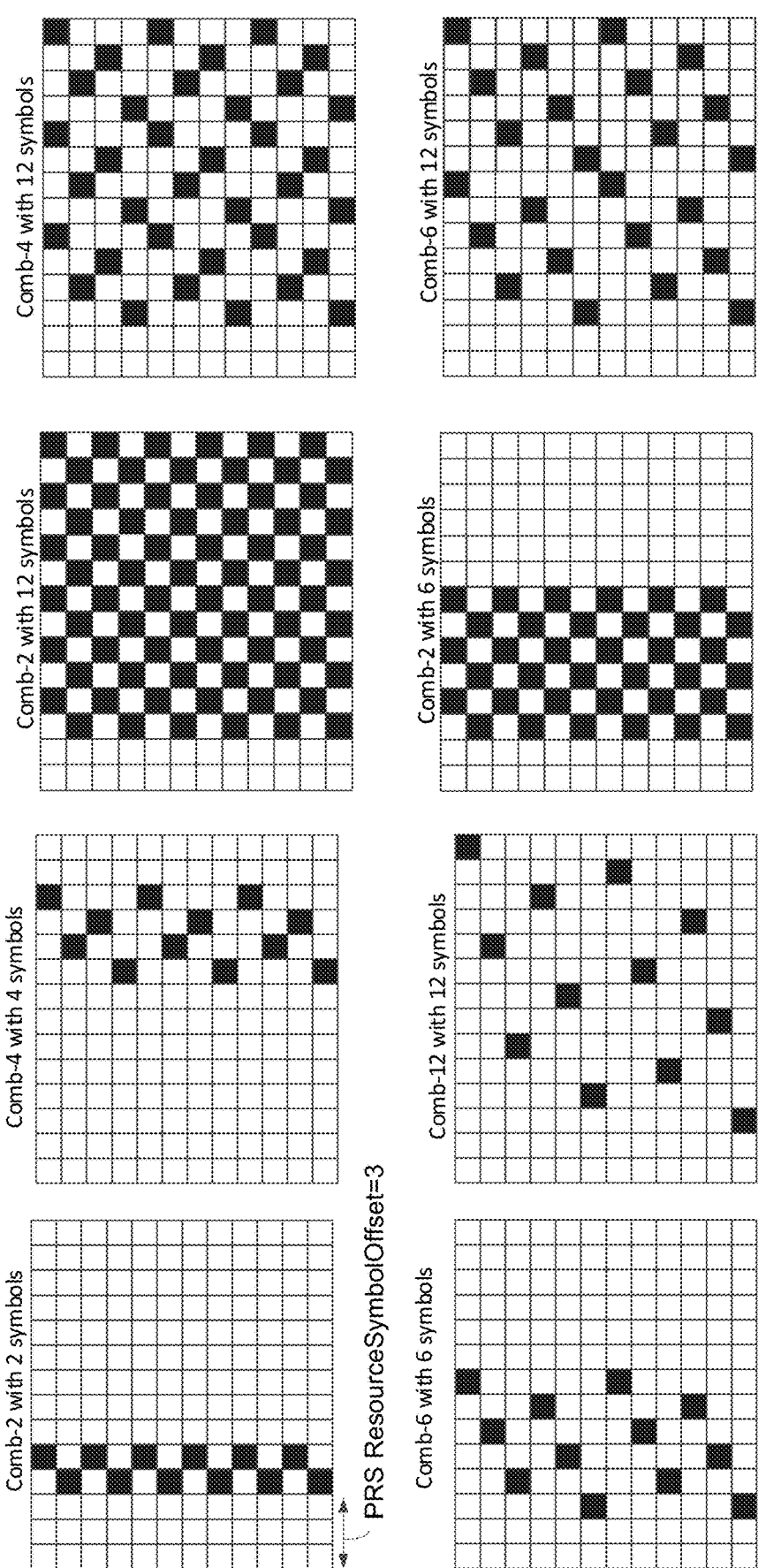
FIG. 5 is a diagram showing example combination (comb) structures, illustrating how RF signals may utilize different sets of resource elements, according to some embodiments.

With reference to the frame structure in FIG. 3, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular combination, or "comb," size. (Comb size also may be referred to as the "comb density.") A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS. Examples of different comb sizes using with different numbers of symbols are provided in FIG. 5.

A "PRS resource set" comprises a group of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). A "PRS resource repetition" is a repetition of a PRS resource during a PRS occasion/instance. The number of repetitions of a PRS resource may be defined by a "repetition factor" for the PRS resource. In addition, the PRS resources in a PRS resource set may have the same periodicity, a common muting pattern configuration, and the same repetition factor across slots. The periodicity may have a length selected from $2^m.\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

In the 5G NR positioning system 200 illustrated in FIG. 2, a TRP (gNB 210, ng-eNB 214, and/or WLAN 216) may transmit frames, or other physical layer signaling sequences, supporting PRS signals (i.e. a DL-PRS) according to frame configurations as previously described, which may be measured and used for position determination of the UE 105. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

Figure 6:
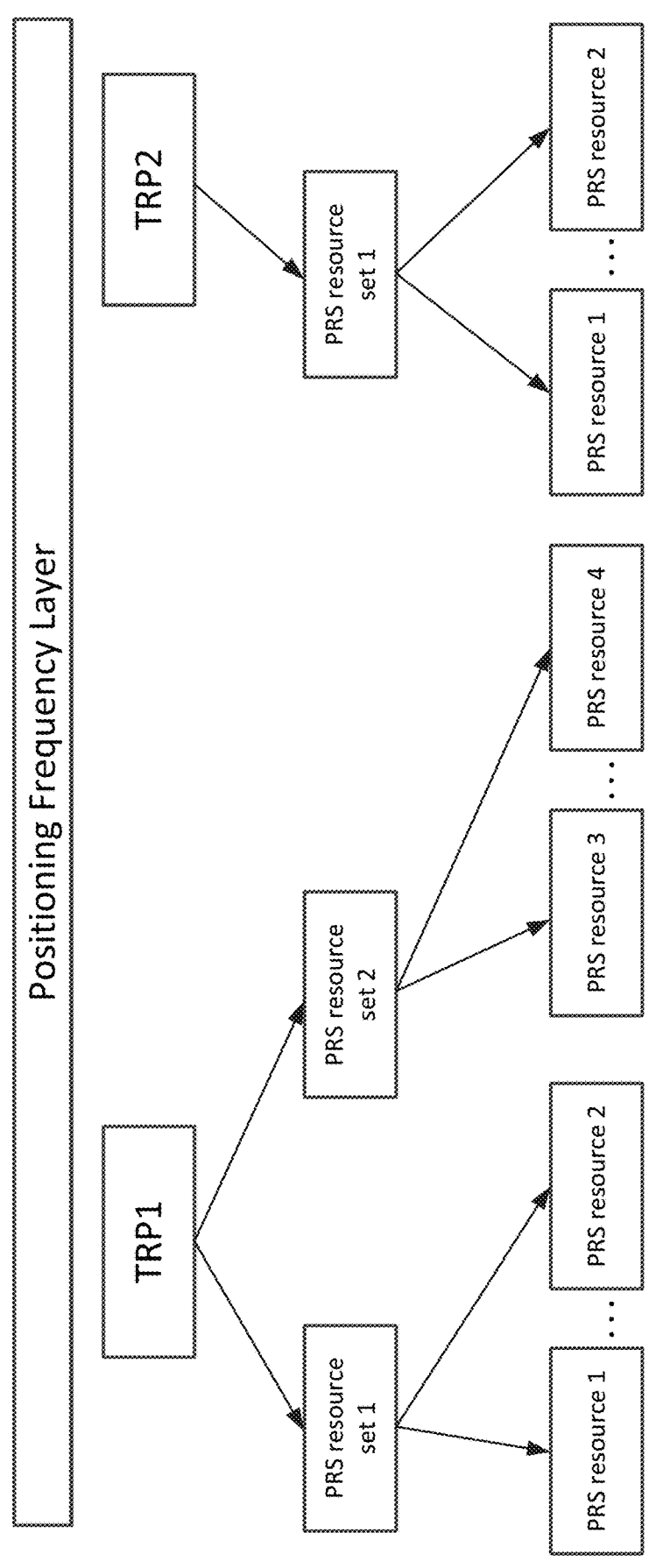
FIG. 6 is a diagram of a hierarchical structure of how PRS resources and PRS resource sets may be used by different Transmission Reception Point (TRPs) of a given position frequency layer (PFL), as defined in 5G NR.

FIG. 6 is a diagram of a hierarchical structure of how PRS resources and PRS resource sets may be used by different TRPs of a given position frequency layer (PFL), as defined in 5G NR. With respect to a network (Uu) interface, a UE 105 can be configured with one or more DL-PRS resource sets from each of one or more TRPs. Each DL-PRS resource set includes K≥1 DL-PRS resource(s), which, as previously noted, may correspond to a Tx beam of the TRP. A DL-PRS PFL is defined as a collection of DL-PRS resource sets which have the same subcarrier spacing (SCS) and cyclic prefix (CP) type, the same value of DL-PRS bandwidth, the same center frequency, and the same value of comb size. In current iterations of the NR standard, a UE 105 can be configured with up to four DL-PRS PFLs.

NR has multiple frequency bands across different frequency ranges (e.g., Frequency Range 1 (FR1) and Frequency Range 2 (FR2)). PFLs may be on the same band or different bands. In some embodiments, they may even be in different frequency ranges. Additionally, as illustrated in FIG. 6, multiple TRPs (e.g., TRP1 and TR2) may be on the same PFL. Currently under NR, each TRP can have up to two PRS resource sets, each with one or more PRS resources, as previously described.

Different PRS resource sets may have different periodicity. For example, one PRS resource set may be used for tracking, and another PRS resource that could be used for acquisition. Additionally or alternatively, one PRS resource set may have more beams, and another may have fewer beams. Accordingly, different resource sets may be used by a wireless network for different purposes.

As discussed herein, in some embodiments, TDOA assistance data may be provided to a UE 105 by a location server (e.g., location server 160) for a "reference cell" (which also may be called "reference resource"), and one or more "neighbor cells" or "neighboring cells" (which also may be called a "target cell" or "target resource"), relative to the reference cell. For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters applicable to TDOA or some other position method. PRS-based positioning by a UE 105 may be facilitated by indicating the serving cell for the UE 105 in the TDOA assistance data (e.g., with the reference cell indicated as being the serving cell).

In some embodiments, TDOA assistance data may also include "expected Reference Signal Time Difference (RSTD)" parameters, which provide the UE 105 with information about the RSTD values the UE 105 is expected to measure at its current location between the reference cell and each neighbor cell, together with an uncertainty of the expected RSTD parameter. The expected RSTD, together with the associated uncertainty, may define a search window for the UE 105 within which the UE 105 is expected to measure the RSTD value. TDOA assistance information may also include PRS configuration information parameters, which allow a UE 105 to determine when a PRS positioning occasion occurs on signals received from various neighbor cells relative to PRS positioning occasions for the reference cell, and to determine the PRS sequence transmitted from various cells in order to measure a signal ToA or RSTD.

Using the RSTD measurements, the known absolute or relative transmission timing of each cell, and the known position(s) of wireless node physical transmitting antennas for the reference and neighboring cells, the UE position may be calculated (e.g., by the UE 105 or by the location server 160). More particularly, the RSTD for a neighbor cell "k" relative to a reference cell "Ref," may be given as ($ToA_k$-$ToA_{Ref}$), where the ToA values may be measured modulo one subframe duration (1 ms) to remove the effects of measuring different subframes at different times. ToA measurements for different cells may then be converted to RSTD measurements and sent to the location server 160 by the UE 105. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 105 position may be determined.

Figure 7:
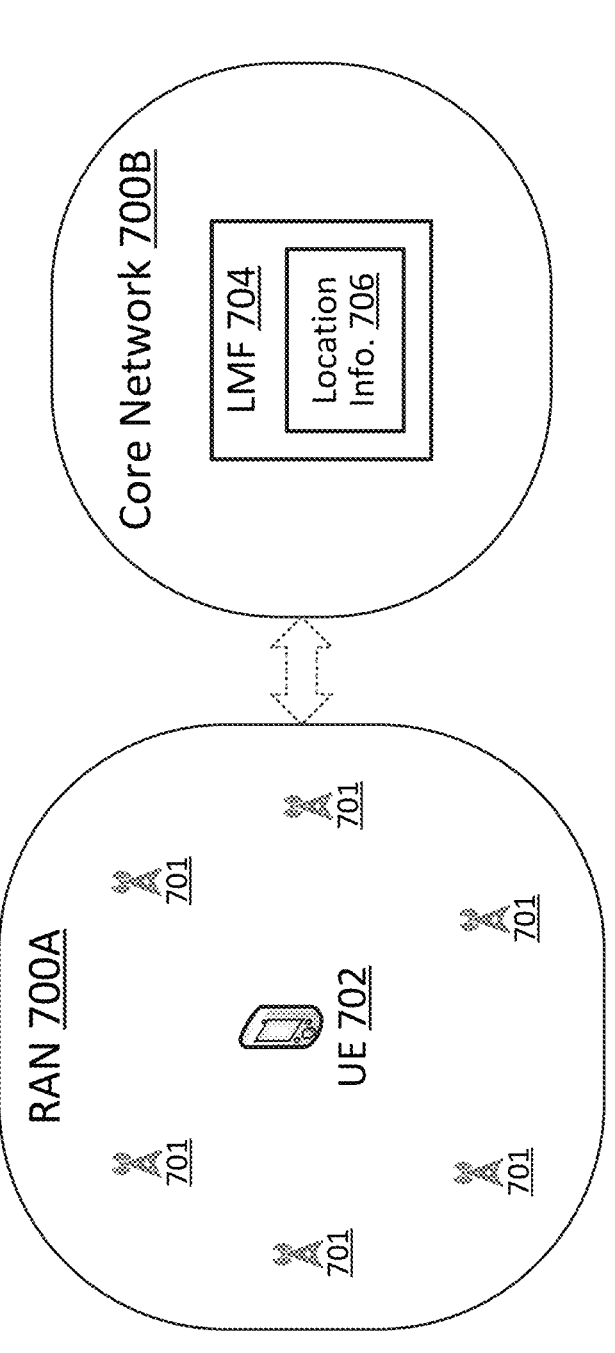
FIG. 7 illustrates an example communication system.

FIG. 7 illustrates an example communication system 700. Communication system 700 includes a radio access network (RAN) 700A and a core network 700B. According to various implementations, RAN 700A can be a 3GPP 5G RAN, such as an NG-RAN. According to various implementations, core network 700B can be a 3GPP 5G core network (5GC). In some implementations, RAN 700A and core network 700B can correspond to NG-RAN 235 and 5G CN 240 of FIG. 2, respectively. Communication system 700 can provide wireless connectivity (e.g., wireless data connectivity and/or wireless voice connectivity) to user equipment (UE) 702. According to some implementations, UE 702 can correspond to UE 105 of FIGS. 1 and 2.

Core network 700B can track the locations of UEs in RAN 700A in support of location-dependent aspects of service(s) provided to such UEs. Location management functions (LMFs) of core network 700B can provide location services to make information regarding UE locations available to other entities in communication system 700. Entities requiring information regarding locations of UEs in RAN 700A can obtain that information by submitting requests to LMFs of core network 700B.

In the example depicted in FIG. 7, an LMF 704 in core network 700B can provide requesting entities with location information 706 regarding UE 702. Location information 706 can indicate a location of UE 702 in the form of geographic coordinates, for example. LMF 704 can compose location information 706 based on position information provided by RAN 700A that indicates estimated position(s) of UE 702.

In RAN 700A, various positioning methods can be used to determine estimated position(s) of devices such as UE 702. These positioning methods can include time-of-flight (ToF)-based positioning methods. According to some ToF-based positioning methods, the positions of UEs in RAN 700A can be estimated based on ToFs of transmissions from various transmission points (TPs), such as transmission/reception points (TRPs) 701, to those UEs. According to some other ToF-based positioning methods, the positions of UEs in RAN 700A can be estimated based on ToFs of transmissions from those UEs to various reception points (RPs), such as TRPs 701. For instance, according to an example ToF-based positioning method, a position of UE 702 can be estimated by determining the respective ToFs of line-of-sight (LOS) transmissions to UE 702 from several TRPs 701, estimating respective distances between UE 702 and those TRPs 701 based on the ToFs, and triangulating the position of UE 702 according to the estimated distances.

Some transmissions between UE 702 and TRPs 701 in RAN 700A may be subject to multipath propagation effects. A transmission subject to multipath propagation effects can reach its destination at multiple different times, via different respective paths. For instance, a signal may travel from its point of origin to a destination via both a direct path—also known as a line-of-sight (LOS) path—as well as one or more indirect (non-LOS) paths. Signal propagation along such non-LOS paths may involve, for example, reflection and/or diffraction of the signal (e.g., by structures, surfaces, objects, etc.).

According to one approach, if UE 702 receives multiple "copies" of a same positioning signal due to multipath propagation, it can assume that the copy received with the highest received power corresponds to an LOS path between UE 702 and the transmitter of the positioning signal (e.g., a TRP 701). However, in some cases, unbeknownst to UE 702, there may be no LOS path between UE 702 and the transmitter, such that each received copy of the positioning signal corresponds to a non-LOS path. In fact, even in the absence of multipath propagation, UE 702 may not know whether a received positioning signal has been received via an LOS path or a non-LOS path. Thus, an assumption that a strongest detected copy of a positioning signal corresponds to an LOS path (or that an only detected copy corresponds to an LOS path) may be erroneous in some cases. In such cases, a distance estimate based on a ToF of the strongest detected copy will also be erroneous, which may negatively impact the results of position estimation.

Disclosed herein are LOS probability map signaling techniques that can aid in the identification of LOS links for use in conjunction with positioning operations. According to aspects of the disclosure, communication system 700 can implement an LOS probability mapping scheme, in conjunction with which LOS probability maps can be defined to facilitate determinations/estimations of whether links between UEs and TRPs 701 (and/or TPs/RPs) in RAN 700A are LOS links. According to some implementations, signaling of LOS probability maps can be LMF-initiated, such that LMFs "push" LOS probability maps to UEs. According to some implementations, signaling of LOS probability maps can be UE-initiated, such that UEs receive LOS probability maps from LMFs on request. Some implementations may feature a combination of LMF-initiated and UE-initiated LOS probability map signaling, such that LMFs push some LOS probability maps to UEs, and UEs can obtain additional LOS probability maps from LMFs by request.

Figure 8:
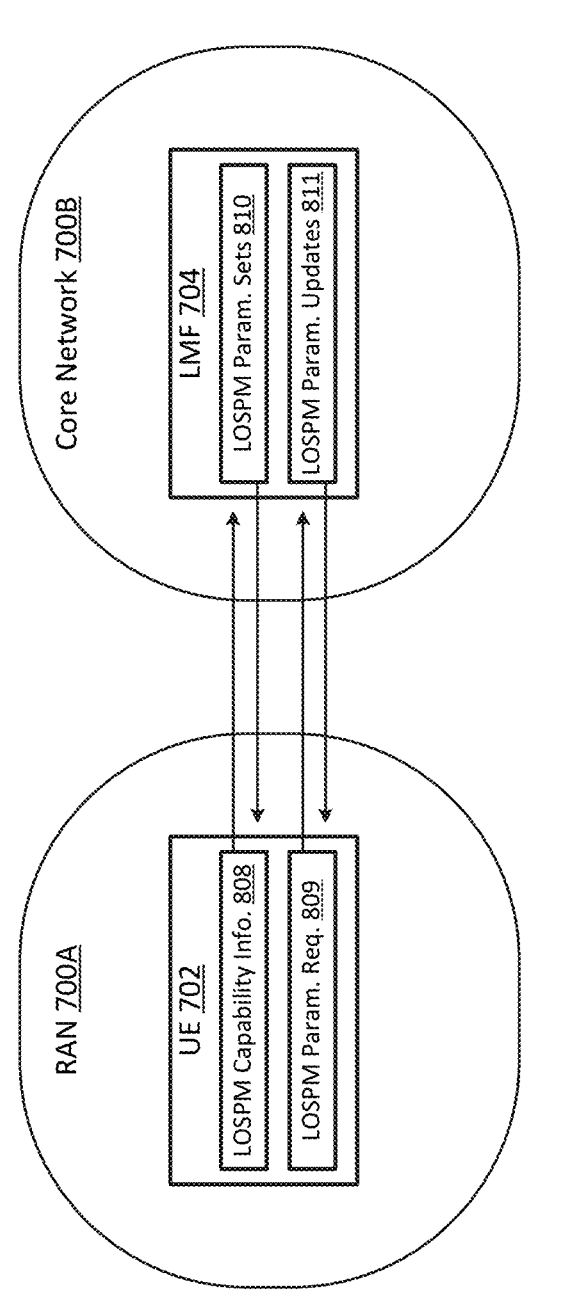
FIG. 8 illustrates an example operating environment.
Figure 8:

FIG. 8 illustrates an example operating environment 800 in which LOS probability map signaling techniques can be utilized by the communication system 700 described in relation to FIG. 7, according to aspects of the disclosure. In operating environment 800, UE 702 and LMF 704 can communicate with each other in accordance with an LOS probability mapping scheme. According to the LOS probability mapping scheme, LOS probability maps can be defined to facilitate determinations/estimations of whether links between UEs and TRPs (and/or other TPs/RPs) in RAN 700A are LOS links.

An LOS probability map for a given TRP can define a plurality of LOS probability map regions. Any particular LOS probability map region can be represented as a closed polygon, and can be defined by a set of points representing the vertices of that closed polygon. Such a closed polygon can be—but need not necessarily be—a convex hull. The points in the defining set can correspond to geographical coordinates. In some implementations, a limit can be imposed on the number of vertices that any given map region can include. For instance, according to an example of such a limit, any given map region may include up to six vertices.

For each LOS probability map region, the LOS probability map can specify a corresponding LOS probability function, the output of which represents the probability of a link between the TRP and a point (x,y) in that LOS probability map region being an LOS link. With respect to any given LOS probability map region, the LOS probability function can be a deterministic function, a constant value, or a neural network (NN)-based function that takes the coordinates (x,y) as input.

According to aspects of the disclosure, some TRPs in RAN 700A can comprise multi-antenna systems that transmit multiple beams. In some implementations, multiple LOS probability maps can be defined for such multi-beam TRPs, each one of which can correspond to a respective beam. In some implementations, a composite LOS probability map can be defined that applies to all beams of a multi-beam TRP. In some implementations, composite LOS probability maps can be defined for some multi-beam TRPs of RAN 700A, while per-beam LOS probability maps are defined for other multi-beam TRPs of RAN 700A.

Figure 9:
FIG. 9 illustrates an example LOS probability map.
Figure 9:
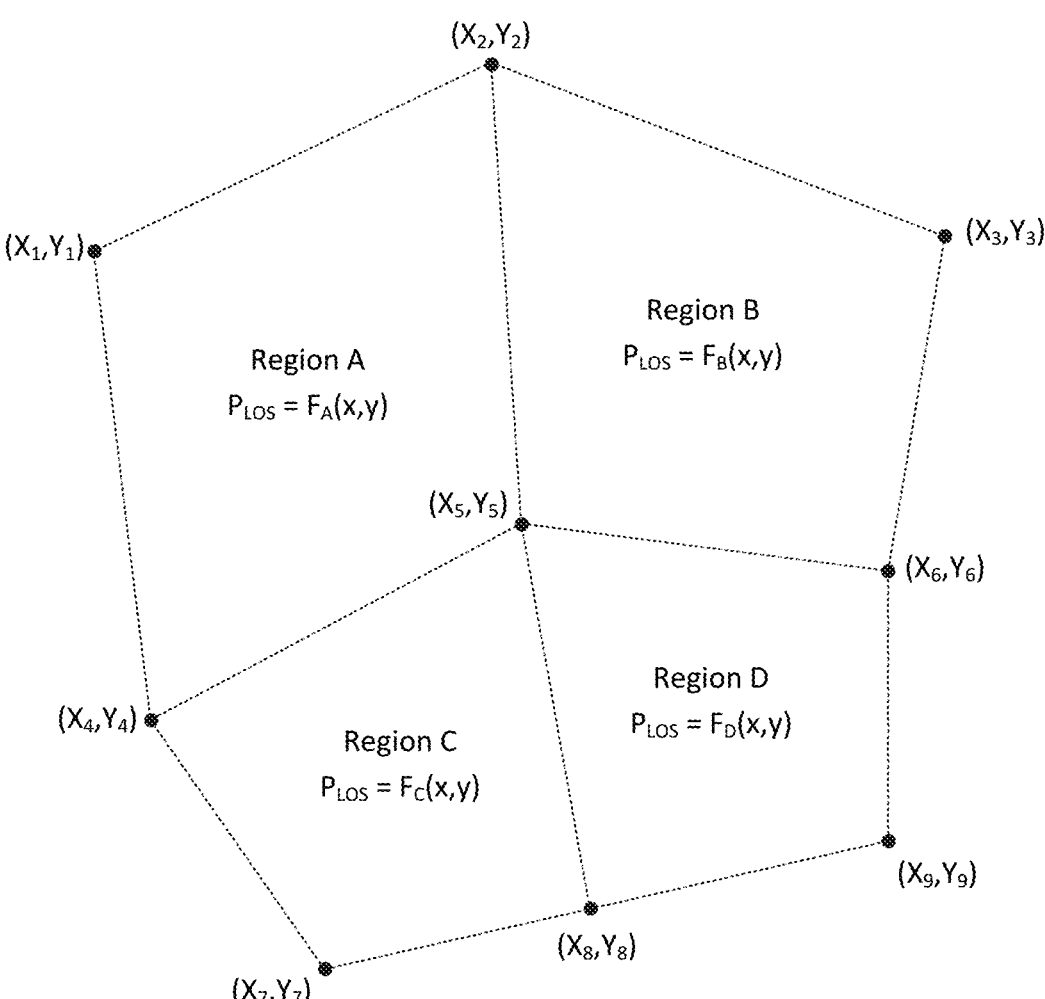

FIG. 9 illustrates an example LOS probability map 900 according to aspects of the disclosure. LOS probability map 900 may be representative of an LOS probability map 900 for a TRP in RAN 700A, which could be a single-beam TRP or a multi-beam TRP. LOS probability map 900 includes LOS probability map regions A, B, C, and D. Each such region is a closed polygon defined by sets of coordinates corresponding to its vertices. The coordinates of the vertices of LOS probability map region A are $(X_1,Y_1)$, $(X_2,Y_2)$, $(X_5,Y_5)$, and $(X_4,Y_4)$. The coordinates of the vertices of LOS probability map region B are $(X_2,Y_2)$, $(X_3,Y_3)$, $(X_6, Y_6)$, and $(X_5,Y_5)$. The coordinates of the vertices of LOS probability map region C are $(X_4,Y_4)$, $(X_5,Y_5)$, $(X_5,Y_5)$, and $(X_7,Y_7)$. The coordinates of the vertices of LOS probability map region D are $(X_5,Y_5)$, $(X_6,Y_6)$, $(X_9,Y_9)$, and $(X_5,Y_5)$.

Within LOS probability map regions A, B, C, and D, the probabilities $P_{LOS}$ of links to points in those regions being LOS links are indicated by respective probability functions $F_A(x,y)$, $F_B(x,y)$, $F_C(x,y)$, and $F_D(x,y)$. Any given one of these functions can be, for example, a deterministic function of the coordinates (x,y) or an NN-based function of the coordinates (x,y), such that the value of $P_{LOS}$ can vary from one point to another within the LOS probability map region. Any given one of these functions can alternatively specify a single value of $P_{LOS}$ that applies to all points within the LOS probability map region.

In operating environment 800 of FIG. 8, UEs in RAN 700A can use control signaling to inform LMFs in core network 700B of whether or not they are capable of utilizing LOS probability maps. For example, UE 702 can send LOS probability map (LOSPM) capability information 808 to LMF 704 that indicates that UE 702 is capable of utilizing LOS probability maps.

According to aspects of the disclosure, LMFs in core network 700B can provide LOS probability map parameters to UEs in RAN 700A in the form of LOSPM parameter sets. In operating environment 800, LMF 704 can send one or more LOSPM parameter sets 810 to UE 702. In some implementations, LMF 704 can send LOSPM parameter sets 810 to UE 702 following a determination (e.g., based on LOSPM capability information 808) that UE 702 is capable of utilizing LOS probability maps. Each LOSPM parameter set (such as any of LOSPM parameter sets 810) can indicate a respective probability function and vertex coordinates for a map region of an LOS probability map. For example, LOSPM parameter sets 810 could include parameter sets indicating the respective vertex coordinates and probability functions for each of regions A, B, C, and D of LOS probability map 900 of FIG. 9. LMF 704 can determine/refine the probability functions that it provides in LOSPM parameter sets 810 according to an LOS probability model, as is discussed below.

According to aspects of the disclosure, there may be limits upon the amounts of LOS probability map parameters (e.g., the numbers of LOSPM parameter sets) that UEs in RAN 700A can store and/or process at one time. In some implementations, UEs in RAN 700A can use control signaling to inform LMFs in core network 700B of their LOS probability map parameter storage/processing capabilities. For example, in operating environment 800, UE 702 may use control signaling to notify LMF 704 of a maximum number of LOSPM parameter sets that UE 702 can store/process at one time. According to aspects of the disclosure, UE 702 may inform LMF 704 of this limitation by including an indication of it within LOSPM capability information 808. This maximum number can represent a per-TRP limit (or per-TRP, per-beam, limit in the case of a multi-beam TRP for which per-beam maps are implemented), or can represent an overall limit across all TRPs and beams.

According to aspects of the disclosure, LMF 704 can tailor the LOSPM parameter sets 810 that it provides to UE 702 based on an approximate location of UE 702, such as a current cell association of UE 702 or a last known location of UE 702. In some implementations, LMF 704 can identify one or more TRPs in the vicinity of the approximate location of UE 702, and can provide UE 702 with LOSPM parameter sets 810 for regions of LOS probability maps for those one or more TRPs. In some implementations, as UE 702 subsequently moves within RAN 700A, LMF 704 can provide UE 702 with additional LOSPM parameter sets 810. These can include LOSPM parameter sets 810 for additional regions of the LOS probability maps for the one or more previously-identified TRPs and/or LOSPM parameter sets 810 for regions of LOS probability maps for other TRPs that UE 702 enters the vicinity of as it moves. In some implementations, as UE 702 receives new LOSPM parameter sets 810 from LMF 704, it may discard previously-stored LOSPM parameter sets 810 (for example, LOSPM parameter sets 810 associated with TRPs that UE 702 is no longer in the vicinity of).

In some implementations, LMF 704 can push relevant LOSPM parameter sets 810 to UE 702 upon determining that UE 702 can utilize LOS probability maps. In some such implementations, LMF 704 can subsequently push additional LOSPM parameter sets 810 to UE 702 as UE 702 moves within RAN 700A. In some implementations, UE 702 can pull LOSPM parameter sets 810 from LMF 704. In some implementations, LMF 704 may not provide UE 702 with LOS probability map parameters by default, but may initiate signaling of LOS probability parameters to UE 702 upon request. For instance, in operating environment 800, UE 702 may send an LOSPM parameter request 809 to LMF 704 to request LOS probability map parameters, and LMF 704 may send LOSPM parameter sets 810 to UE 702 in response to that LOSPM parameter request 809. According to aspects of the disclosure, LOSPM parameter request 809 can specify a set of TRPs for which LOSPM parameters are desired. In some implementations, LOSPM parameter request 809 can specify desired LOSPM parameters on a per-PRS resource set or per-PRS resource basis. In some implementations, as it moves within RAN 700A, UE 702 may send additional LOSPM parameter requests 809 to LMF 704 request additional LOSPM parameters (for example, LOSPM parameter sets 810 associated with TRPs that UE 702 has moved to within the vicinity of).

LMF 704 may convey LOSPM parameter sets 810 to UE 702 using control signaling of any of various protocol layers. In some implementations, LMF 704 can convey LOSPM parameter sets 810 to UE 702 using non-access stratum (NAS) signaling. In some implementations, LMF 704 can convey LOSPM parameter sets 810 to UE 702 via an intermediate node in RAN 700A (e.g., a gNB) using radio resource control (RRC) signaling, such as in the form of RRC messages. For instance, LMF 704 may convey one or more LOSPM parameter sets 810 to UE 702 by including them in a field (e.g., an 'environment' field) of a CommonIEsRequestLocationInformation message. In some implementations, LMF 704 can convey LOSPM parameter sets 810 to UE 702 via an intermediate node in RAN 700A (e.g., a gNB) using medium access control (MAC) signaling, such as in the form of MAC control elements (CEs). In some implementations, LOSPM parameter sets 810 can be conveyed to UE 702 in downlink control information (DCI).

In some implementations, LMF 704 can provide UE 702 with multiple LOSPM parameter sets 810 at one time. For instance, LMF 704 may use one NAS or RRC message, or MAC CE, to provide UE 702 with LOSPM parameter sets 810 for each of multiple regions of a LOS probability map for a given TRP (or multiple TRPs). In some implementations, LMF 704 can provide UE 702 with LOSPM parameter sets 810 on a per-PFR basis, according to which it may use one NAS or RRC message, or MAC CE, to provide UE 702 with LOSPM parameter sets 810 associated with multiple TRPs on a same PFR.

In some implementations, LMF 704 can send LOSPM parameter updates 811 to UE 702 to update and/or supplement LOSPM parameter sets 810 that it has previously sent to UE 702. According to aspects of the disclosure, LOSPM parameter updates 811 can include changes to parameters in LOSPM parameter sets 810 that UE 702 has already received (e.g., changes in the probability functions of map regions described by previously provided LOSPM parameter sets 810). LOSPM parameter updates 811 can take the form of NAS or RRC messages, MAC CEs, DCI, or some other form. In some implementations, LOSPM parameter updates 811 can take the same form as LOSPM parameter sets 810. In other implementations, LOSPM parameter updates 811 can take a different form than LOSPM parameter sets 810. For instance, in an example, LOSPM parameter sets 810 could be conveyed via NAS messages, and LOSPM parameter updates 811 could be conveyed via MAC CEs. In some implementations, LOSPM parameter updates 811 can be tagged with expiry timers that indicate how long the LOSPM parameter updates 811 are to be considered current. In some implementations, when such expiry timers elapse, LMF 704 can push new LOSPM parameter updates 811 to UE 702, or UE 702 can request new LOSPM parameter updates 811 from LMF 704.

According to aspects of the disclosure, UE 702 may be configurable to operate in both an LOSPM inference mode and an LOSPM training mode. In the LOSPM inference mode, UE 702 can utilize LOSPM parameter sets 810 and LOSPM parameter updates 811 to inform its conclusions regarding whether links are LOS or non-LOS, without assisting LMF 704 with training of the LOS probability model used to determine/refine the probability functions in LOSPM parameter sets 810 and LOSPM parameter updates 811. In the LOSPM training mode, UE 702 can evaluate the predictions of the LOS probability model based on empirical observations, and can provide feedback to LMF 704 to identify predictions that substantially differ from observations of UE 702.

In some implementations, UE 702 can evaluate predictions of the LOS probability model by comparing positions implied by the model with positions indications from other sources, such as GPS or sensor information. For example, if the LOS probability model indicates (e.g., via a probability function in a LOSPM parameter set 810) that a link from a given map region to a given TRP is almost certainly an LOS link, but a GPS device of UE 702 indicates that its position is substantially different from what it should be if the link is an LOS link, UE 702 can conclude that the LOS probability model is inaccurate with respect to that map region.

In some implementations, UE 702 can provide feedback to LMF 704 to report inaccuracies that it encounters with respect to LOS probabilities predicted by the model. In some implementations, UE 702 can accumulate information regarding such inaccuracies over some period of time and then provide that information to LMF 704, rather than notifying LMF 704 of inaccuracies on a per-positioning-instance basis. In some implementations, UE 702 can enter the LOSPM training mode in response to an instruction received from LMF 704 or another entity in core network 700B. In some implementations, the instruction can specify a set of PRS resources for which UE 702 is to provide feedback.

According to aspects of the disclosure, centralized LOSPM model training can be conducted in core network 700B using the collective feedback of numerous UEs in RAN 700A, such as can be received by LMFs of core network 700B. In some implementations, UEs in RAN 700A can additionally or alternatively conduct distributed LOSPM model training. According to a distributed LOSPM model training scheme, the probability functions of LOS probability map regions can be trained using neural network models. Loss functions for use in training the neural network models can be provided to the UEs by core network 700B. Based on their own observations, UEs in RAN 700A can update weights of neural network models used to derive those probability functions. The UEs can (e.g., following a con-figured training period) provide modified neural network weights and/or gradients to core network 700B as feedback, which core network 700B can use to conduct LOSPM model refinement.

According to aspects of the disclosure, in the LOSPM inference mode, UEs in RAN 700A can provide multipath information to core network 700B (e.g., to LMFs or training server(s)) based on measurements of PRSs transmitted by TRPs in RAN 700A. Additionally or alternatively, TRPs in RAN 700A can provide multipath information to core net-work 700B based on measurements of SRSs transmitted by UEs in RAN 700A. In some implementations, UEs in RAN 700A can provide core network 700B with independent ground truth position estimates while operating in the LOSPM inference mode.

According to aspects of the disclosure, in the LOSPM training mode, UEs in RAN 700A can provide assistance data to core network 700B to aid in LOSPM model training. Such assistance data can include, for example, any or all of port IDs, panel IDs, beamforming information, UE orienta-tion information, Rx-Tx turnaround times, and group delay information. In some implementations, a learning period can be defined during which a given UE is to report such assistance data. Core network 700B can indicate/configure such a learning period using an RRC message, MAC CE, or DCI, or in another manner. In some implementations, core network 700B can use RRC message(s), MAC CE(s), or DCI to indicate the start of a learning period and specify a duration of that learning period. In some implementations, a given UE may temporarily increase its positioning process-ing capabilities during a learning period, by reallocating processing capabilities normally used for other purposes.

According to aspects of the disclosure, core network 700B can utilize information regarding aspects (e.g., ToFs and received powers) of received multipath components at known ("ground truth") locations in conjunction with train-ing an LOS probability model for use in predicting LOS probabilities at other locations. In some implementations, for instance, information regarding ToFs and received pow-ers of multipath components can be used as training data for an observability model that infers the observabilities of TRPs and virtual TRPs (vTRPs) at specified locations. In some implementations, the observability model can be implemented as a neural network. In some implementations, for a given specified location, the output of the neural network can be a probability vector comprising elements that each represent a probability of observability of that location to a respective one of a plurality of TRP(s) and/or vTRP(s).

Figure 10:
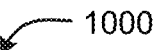
FIG. 10 is a flow diagram of a first method, according to an embodiment.
Figure 10:
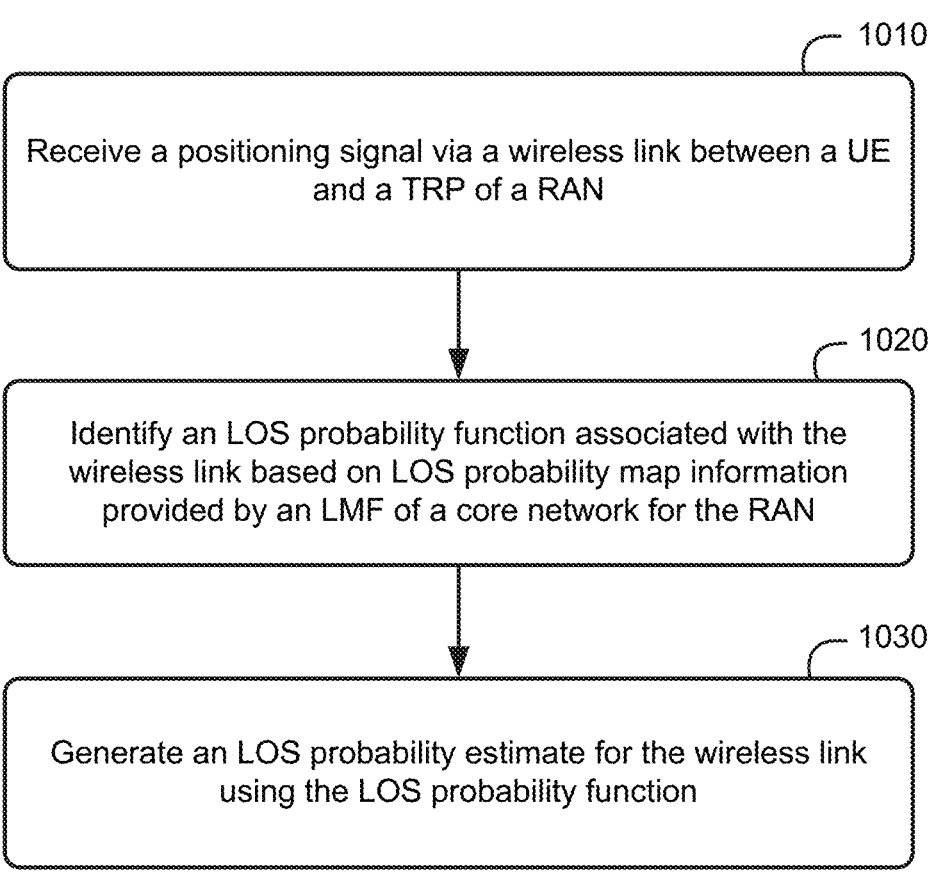
Figure 13:
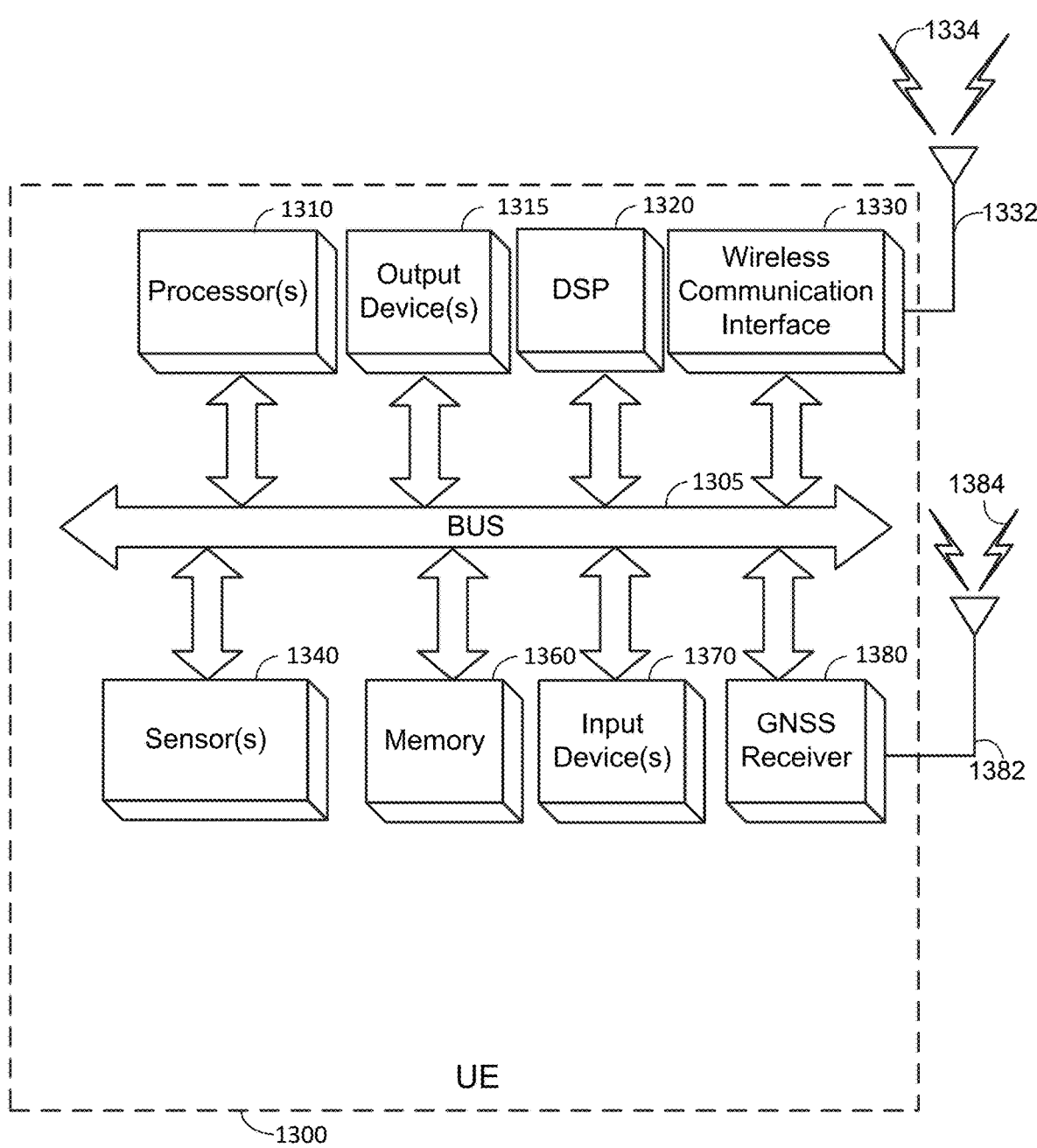
FIG. 13 is a block diagram of an embodiment of a UE, which can be utilized in embodiments as described herein.

FIG. 10 is a flow diagram of a method 1000 for wireless communication by a UE, according to an embodiment. Means for performing the functionality illustrated in one or more of the blocks shown in FIG. 10 may be performed by hardware and/or software components of a UE, such as by UE 702 in operating environment 800 of FIG. 8. Example components of a UE are illustrated in FIG. 13, which is described in more detail below.

At block 1010, the functionality comprises receiving a positioning signal via a wireless link between a UE and a TRP of a RAN. For example, in operating environment 800 of FIG. 8, UE 702 can receive a positioning signal from a TRP of RAN 700A via a wireless link between UE 702 and that TRP. Means for performing functionality at block 1010 may comprise a bus 1305, processors 1310, digital signal processor (DSP) 1320, wireless communication interface 1330, memory 1360, and/or other components of a UE, as illustrated in FIG. 13.

At block 1020, the functionality comprises identifying an LOS probability function associated with the wireless link based on LOS probability map information provided by an LMF of a core network for the RAN. For example, in operating environment 800 of FIG. 8, UE 702 can identify an LOS probability function associated with a wireless link between UE 702 and a TRP of RAN 700A, based on LOS probability map information (which can include LOSPM parameter sets 810 and/or LOSPM parameter updates 811) provided by LMF 704 of core network 700B. According to aspects of the disclosure, the LOS probability map infor-mation can be obtained from a received NAS message, RRC message, or MAC CE. In some implementations, the LOS probability function can correspond to an LOS probability map region associated with the wireless link. In some implementations, the LOS probability map information can indicate vertex coordinates for the LOS probability map region to which the LOS probability function corresponds. In some implementations, the LOS probability map infor-mation can indicate respective LOS probability functions and vertex coordinates for multiple LOS probability map regions associated with the wireless link. Means for per-forming functionality at block 1020 may comprise a bus 1305, processors 1310, DSP 1320, wireless communication interface 1330, memory 1360, and/or other components of a UE, as illustrated in FIG. 13.

According to aspects of the disclosure, the LOS probabil-ity function identified at block 1020 can be identified from among multiple LOS probability functions associated with the wireless link, and each such LOS probability function can correspond to a respective one of multiple LOS prob-ability map regions associated with the wireless link. A location estimate for the UE can be determined, an LOS probability map region within which the UE is located can be identified based on the location estimate, and the LOS probability function identified at block 1020 can be an LOS probability function associated with that LOS probability map region. In some scenarios, it may be unclear, based on the location estimate, which LOS probability map region the UE is located within. In some implementations, in such a scenario, LOS probability functions for multiple LOS prob-ability map regions may be identified at block 1020 for subsequent use at block 1030. The multiple LOS probability map regions can represent various map regions that the UE may be located within based on (and taking into account the uncertainty of) the location estimate.

At block 1030, the functionality comprises generating an LOS probability estimate for the wireless link using the LOS probability function. For example, in operating environment 800 of FIG. 8, UE 702 can generate an LOS probability estimate for a wireless link between UE 702 and a TRP of RAN 700A using an LOS probability function identified at block 1020. Means for performing functionality at block 1020 may comprise a bus 1305, processors 1310, DSP 1320, wireless communication interface 1330, memory 1360, and/or other components of a UE, as illustrated in FIG. 13.

In some implementations, the LOS probability estimate can be generated at block 1030 based on multiple LOS probability functions. For instance, in a scenario in which the LOS probability map region within which the UE is located is unclear and respective LOS probability functions are identified for multiple LOS probability map regions that the UE may be located within, the LOS probability functions for the multiple LOS probability map regions may be used in combination to generate an LOS probability estimate for the wireless link. In some implementations, multiple individual LOS probability estimates can be generated using the multiple LOS probability functions, and an overall LOS probability estimate can be generated at block 1030 as a weighted average of those individual LOS probability estimates. In some implementations, for the purpose of generating such an overall LOS probability estimate, the individual LOS probability estimates can be weighted in accordance with the relative likelihoods (e.g., based on a location estimate) of the UE being located in the corresponding LOS probability map regions.

In some implementations, a position of the UE can be determined on the UE side based on the LOS probability estimate generated at block 1030. For instance, based on the LOS probability estimate generated at block 1030 for the positioning signal received at block 1010, a determination can be made of whether to use (or how to weight) a distance estimate implied by the ToF of the positioning signal as part of the basis for UE-side determination of the position of the UE, and the UE-side position determination can then proceed accordingly.

In some implementations, the LOS probability estimate generated at block 1030 can be reported to the LMF in support of core network-side determination of the position of the UE. In some implementations, the UE can tailor its reporting of measurements to the LMF based on the LOS probability estimate generated at block 1030 (e.g., based on whether the wireless link is sufficiently likely to be an LOS link according to the LOS probability estimate).

Figure 11:
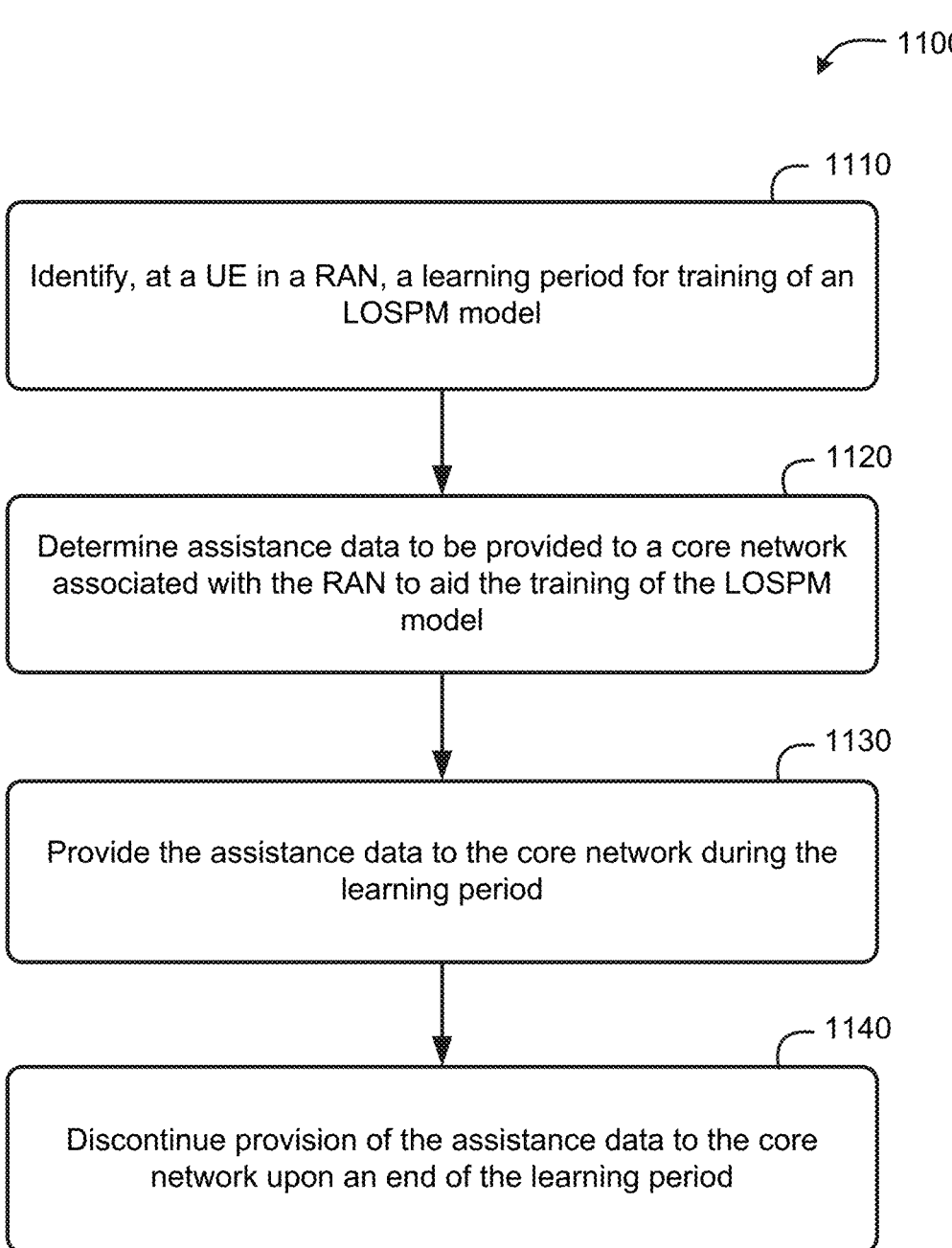
FIG. 11 is a flow diagram of a second method, according to an embodiment.

FIG. 11 is a flow diagram of a method 1100 for wireless communication by a UE, according to an embodiment. Means for performing the functionality illustrated in one or more of the blocks shown in FIG. 11 may be performed by hardware and/or software components of a UE, such as by UE 702 in operating environment 800 of FIG. 8. Example components of a UE are illustrated in FIG. 13, which is described in more detail below.

At block 1110, the functionality comprises identifying, at a UE in a RAN, a learning period for training of an LOSPM model. For example, in operating environment 800 of FIG. 8, UE 702 can identify a learning period for training of an LOSPM model implemented in communication system 700. Means for performing functionality at block 1110 may comprise a bus 1305, processors 1310, DSP 1320, wireless communication interface 1330, memory 1360, and/or other components of a UE, as illustrated in FIG. 13.

According to aspects of the disclosure, the learning period can be identified at block 1110 based on a received RRC message or MAC CE, or based on received DCI. In some implementations, the received RRC message, MAC CE, or DCI can indicate a start time of the learning period and can specify a duration of the learning period. In some implementations, the UE can temporarily increase its positioning processing capabilities during the learning period (e.g., by reallocating processing capabilities normally used for other purposes).

At block 1120, the functionality comprises determining assistance data to be provided to a core network associated with the RAN to aid the training of the LOSPM model. For example, in operating environment 800 of FIG. 8, UE 702 can determine assistance data to be provided to core network 700B to aid training of the LOSPM model implemented in communication system 700. According to aspects of the disclosure, the assistance data to be provided to the core network can include any or all of port IDs, panel IDs, beamforming information, UE orientation information, Rx-Tx turnaround times, and group delay information. Means for performing functionality at block 1120 may comprise a bus 1305, processors 1310, DSP 1320, wireless communication interface 1330, memory 1360, and/or other components of a UE, as illustrated in FIG. 13.

At block 1130, the functionality comprises providing the assistance data to the core network during the learning period. For example, in operating environment 800 of FIG. 8, UE 702 can provide assistance data determined at block 1120 to core network 700B during the learning period identified at block 1110. Means for performing functionality at block 1130 may comprise a bus 1305, processors 1310, DSP 1320, wireless communication interface 1330, memory 1360, and/or other components of a UE, as illustrated in FIG. 13.

At block 1140, the functionality comprises discontinuing provision of the assistance data to the core network upon an end of the learning period. For example, in operating environment 800 of FIG. 8, UE 702 can discontinue provision of assistance data to core network 700B upon an end of the learning period identified at block 1110. Means for performing functionality at block 1140 may comprise a bus 1305, processors 1310, DSP 1320, wireless communication interface 1330, memory 1360, and/or other components of a UE, as illustrated in FIG. 13.

Figure 12:
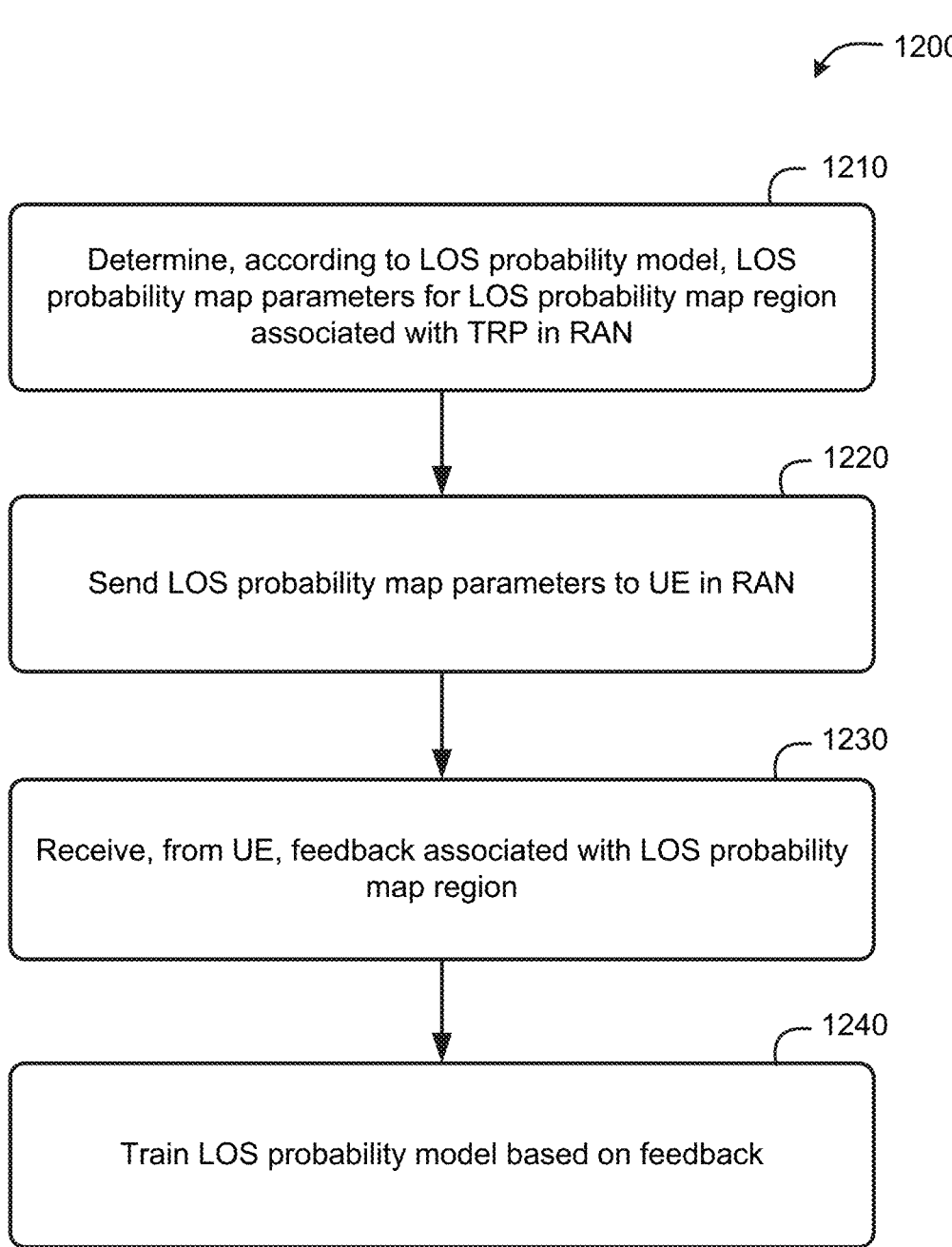
FIG. 12 is a flow diagram of a third method, according to an embodiment.
Figure 14:
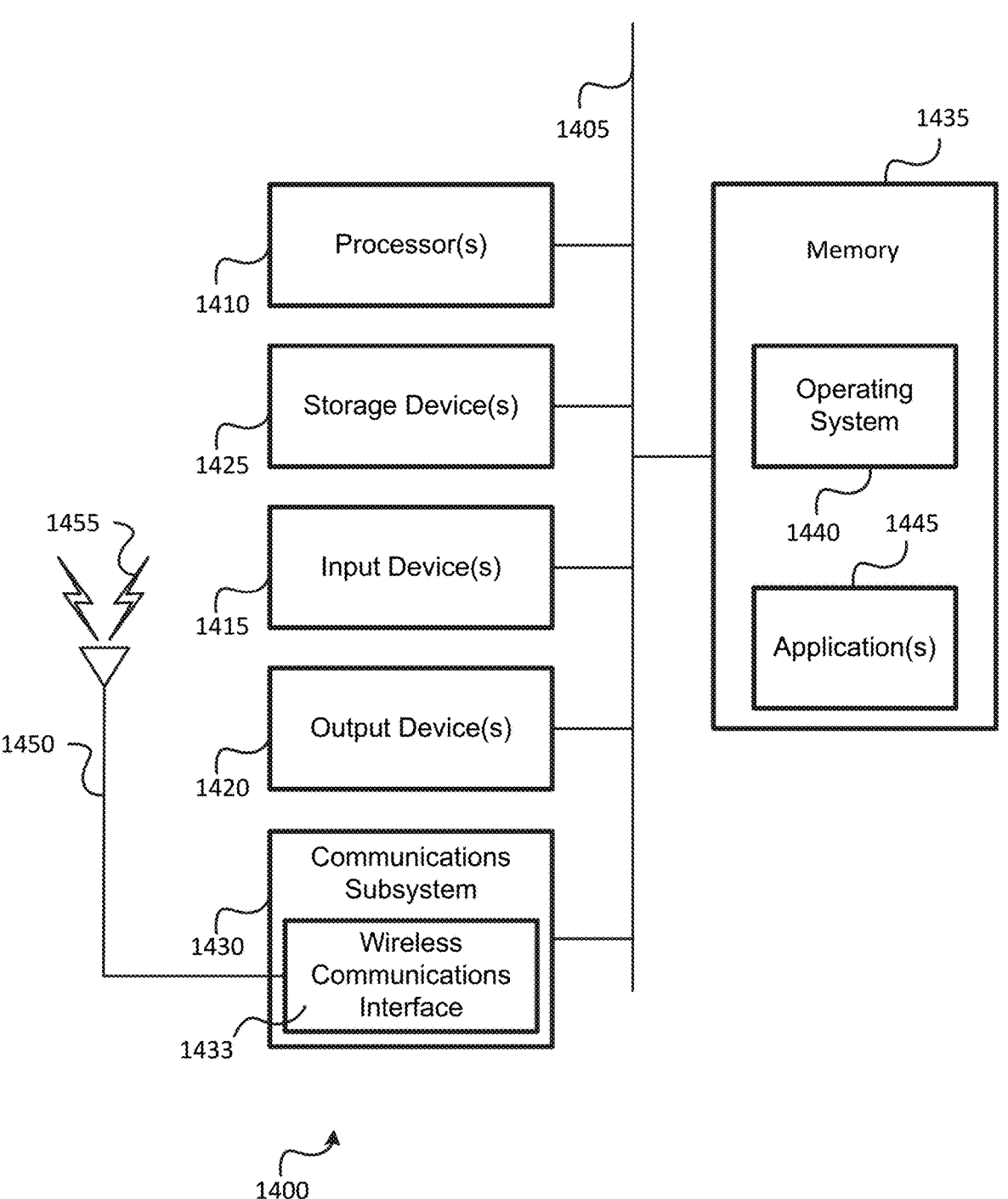
FIG. 14 is a block diagram of an embodiment of a computer system, which can be utilized in embodiments as described herein.

FIG. 12 is a flow diagram of a method 1200 for communication by an LMF of a core network for a RAN, according to an embodiment. Means for performing the functionality illustrated in one or more of the blocks shown in FIG. 12 may be performed by hardware and/or software components of a computer system, such as one implementing LMF 704 in operating environment 800 of FIG. 8. Example components of an example computer system are illustrated in FIG. 14, which is described in more detail below.

At block 1210, the functionality comprises determining, according to an LOS probability model, LOS probability map parameters for an LOS probability map region associated with a TRP in a RAN. For example, in operating environment 800 of FIG. 8, LMF 704 can determine, according to an LOS probability model, LOS parameters set(s) 810 associated with a TRP in RAN 700A. Means for performing functionality at block 1210 may comprise a bus 1405, processor(s) 1410, storage device(s) 1425, communications subsystem 1430, memory 1435, and/or other components of a computing system, as illustrated in FIG. 14.

In some implementations, the LOS probability map parameters can include vertex coordinates of the LOS probability map region. In some implementations, the LOS probability map parameters can include a probability function for the LOS probability map region. In some implementations, a coarse location estimate for the UE can be determined, and the LOS probability map region can be identified based on the coarse location estimate for the UE.

At block 1220, the functionality comprises sending the LOS probability map parameters to a UE in the RAN. For example, in operating environment 800 of FIG. 8, LMF 704 can send LOS parameters set(s) 810 to UE 702. Means for performing functionality at block 1220 may comprise a bus 1405, processor(s) 1410, storage device(s) 1425, communications subsystem 1430, memory 1435, and/or other components of a computing system, as illustrated in FIG. 14. In some implementations, the LOS probability map region can be identified based on a course location estimate for the UE, and the LOS probability map parameters for the LOS probability map region can be sent to the UE responsive to identifying the LOS probability map region.

At block 1230, the functionality comprises receiving, from the UE, feedback associated with the LOS probability map region. For example, in operating environment 800 of FIG. 8, LMF 704 can receive feedback (not shown) from UE 702. Means for performing functionality at block 1230 may comprise a bus 1405, processor(s) 1410, storage device(s) 1425, communications subsystem 1430, memory 1435, and/or other components of a computing system, as illustrated in FIG. 14. In some implementations, the feedback can indicate a location within the LOS probability map region and an LOS probability estimate for the location. In some implementations, the feedback can include multipath information associated with a positioning reference signal (PRS) transmitted by the TRP.

At block 1240, the functionality comprises training the LOS probability model based on the feedback. For example, in operating environment 800 of FIG. 8, LMF 704 can, based on feedback received from UE 702, train an LOS probability model according to which it determined LOSPM parameter set(s) 810 that it send to UE 702 at block 1220. Means for performing functionality at block 1240 may comprise a bus 1405, processor(s) 1410, storage device(s) 1425, communications subsystem 1430, memory 1435, and/or other components of a computing system, as illustrated in FIG. 14. In some implementations, the probability function can be updated based on the feedback.

According to aspects of the disclosure, assistance data can be received from the UE, and the LOS probability model can be trained based on the assistance data and the feedback. In some implementations, a learning period can be initiated for the LOS probability model, and the assistance data can be received from the UE during the learning period. In some implementations, the assistance data can include at least one of a port ID, a panel ID, beamforming information, UE orientation information, an Rx-Tx turn-around time, and group delay information.

FIG. 13 is a block diagram of an embodiment of a UE 1300, which can be utilized as described herein above (e.g., in association with FIGS. 1-2, 7-8, and 10-11). For example, the UE 1300 can be representative of UE 105 in FIGS. 1 and 2 and/or UE 702 in FIGS. 7 and 8, and/or can perform one or more of the functions of the methods shown in FIGS. 10 and 11. It should be noted that FIG. 13 is meant only to provide a generalized illustration of various components, any or all of which may be utilized as appropriate. It can be noted that, in some instances, components illustrated by FIG. 13 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 13.

The UE 1300 is shown comprising hardware elements that can be electrically coupled via a bus 1305 (or may otherwise be in communication, as appropriate). The hardware elements may include a processor(s) 1310 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1310 may comprise one or more processing units, which may be housed in a single integrated circuit (IC) or multiple ICs. As shown in FIG. 13, some embodiments may have a separate DSP 1320, depending on desired functionality. Location determination and/or other determinations based on wireless communication may be provided in the processor(s) 1310 and/or wireless communication interface 1330 (discussed below). The UE 1300 also can include one or more input devices 1370, which can include without limitation one or more keyboards, touch screens, touch pads, microphones, buttons, dials, switches, and/or the like; and one or more output devices 1315, which can include without limitation one or more displays (e.g., touch screens), light emitting diodes (LEDs), speakers, and/or the like.

The UE 1300 may also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1300 to communicate with other devices as described in the embodiments above. The wireless communication interface 1330 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1332 that send and/or receive wireless signals 1334. According to some embodiments, the wireless communication antenna(s) 1332 may comprise a plurality of discrete antennas, antenna arrays, or any combination thereof. The antenna(s) 1332 may be capable of transmitting and receiving wireless signals using beams (e.g., Tx beams and Rx beams). Beam formation may be performed using digital and/or analog beam formation techniques, with respective digital and/or analog circuitry. The wireless communication interface 1330 may include such circuitry.

Depending on desired functionality, the wireless communication interface 1330 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1300 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1300 can further include sensor(s) 1340. Sensor(s) 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1300 may also include a Global Navigation Satellite System (GNSS) receiver 1380 capable of receiving signals 1384 from one or more GNSS satellites using an antenna 1382 (which could be the same as antenna 1332). Positioning based on GNSS signal measurement can be utilized to complement and/or incorporate the techniques described herein. The GNSS receiver 1380 can extract a position of the UE 1300, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1380 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1380 is illustrated in FIG. 13 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1310, DSP 1320, and/or a processor within the wireless communication interface 1330 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like.

The positioning engine may also be executed by one or more processors, such as processor(s) 1310 or DSP 1320.

The UE 1300 may further include and/or be in communication with a memory 1360. The memory 1360 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the UE 1300 also can comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the UE 1300 (and/or processor(s) 1310 or DSP 1320 within UE 1300). In some embodiments, then, such code and/or instructions can be used to configure and/or adapt a general-purpose computer (or other device) to perform one or more operations in accordance with the described methods.

FIG. 14 is a block diagram of an embodiment of a computer system 1400, which may be used, in whole or in part, to provide the functions of one or more network components as described in the embodiments herein (e.g., location server 160 of FIG. 1). According to aspects of the disclosure, computer system 1400 may be used to implement LMF 704 of FIGS. 7 and 8, and/or can perform one or more of the functions of the method shown in FIG. 12. It should be noted that FIG. 14 is meant only to provide a generalized illustration of various components, any or all of which may be utilized as appropriate. FIG. 14, therefore, broadly illustrates how individual system elements may be implemented in a relatively separated or relatively more integrated manner. In addition, it can be noted that components illustrated by FIG. 14 can be localized to a single device and/or distributed among various networked devices, which may be disposed at different geographical locations.

The computer system 1400 is shown comprising hardware elements that can be electrically coupled via a bus 1405 (or may otherwise be in communication, as appropriate). The hardware elements may include processor(s) 1410, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1400 also may comprise one or more input devices 1415, which may comprise without limitation a mouse, a keyboard, a camera, a microphone, and/or the like; and one or more output devices 1420, which may comprise without limitation a display device, a printer, and/or the like.

The computer system 1400 may further include (and/or be in communication with) one or more non-transitory storage devices 1425, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1400 may also include a communications subsystem 1430, which may comprise wireless communication technologies managed and controlled by a wireless communication interface 1433, as well as wired technologies (such as Ethernet, coaxial communications, universal serial bus (USB), and the like). The wireless communication interface 1433 may comprise one or more wireless transceivers that may send and receive wireless signals 1455 (e.g., signals according to 5G NR or LTE) via wireless antenna(s) 1450. Thus the communications subsystem 1430 may comprise a modem, a network card (wireless or wired), an infrared communication device, a wireless communication device, and/or a chipset, and/or the like, which may enable the computer system 1400 to communicate on any or all of the communication networks described herein to any device on the respective network, including a User Equipment (UE), base stations and/or other TRPs, and/or any other electronic devices described herein. Hence, the communications subsystem 1430 may be used to receive and send data as described in the embodiments herein.

In many embodiments, the computer system 1400 will further comprise a working memory 1435, which may comprise a RAM or ROM device, as described above. Software elements, shown as being located within the working memory 1435, may comprise an operating system 1440, device drivers, executable libraries, and/or other code, such as one or more applications 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1425 described above. In some cases, the storage medium might be incorporated within a computer system, such as computer system 1400. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for wireless communication by a user equipment (UE), the method comprising receiving a positioning signal via a wireless link between the UE and a transmission/reception point (TRP) of a radio access network (RAN), identifying a line-of-sight (LOS) probability function associated with the wireless link based on LOS probability map information provided by a location management function (LMF) of a core network for the RAN, and generating an LOS probability estimate for the wireless link using the LOS probability function.

Clause 2. The method of clause 1, wherein the LOS probability function corresponds to an LOS probability map region associated with the wireless link, wherein the LOS probability map information indicates vertex coordinates of the LOS probability map region.

Clause 3. The method of any of clauses 1 to 2, comprising obtaining the LOS probability map information from a received non-access stratum (NAS) message.

Clause 4. The method of any of clauses 1 to 2, comprising obtaining the LOS probability map information from a received radio resource control (RRC) message.

Clause 5. The method of any of clauses 1 to 2, comprising obtaining the LOS probability map information from a received medium access control (MAC) control element (CE).

Clause 6. The method of any of clauses 1 to 5, comprising identifying the LOS probability function from among multiple LOS probability functions associated with the wireless link, wherein each of the multiple LOS probability functions corresponds to a respective one of multiple LOS probability map regions associated with the wireless link.

Clause 7. The method of clause 6, comprising determining a location estimate for the UE, identifying an LOS probability map region from among the multiple LOS probability map regions based on the location estimate, and identifying as the LOS probability function a one of the multiple LOS probability functions that corresponds to the identified LOS probability map region.

Clause 8. The method of clause 6, comprising determining a location estimate for the UE, identifying two or more LOS probability map regions from among the multiple LOS probability map regions based on the location estimate, identifying two or more LOS probability functions comprising a corresponding LOS probability function for each of the two or more LOS probability map regions, and generating the LOS probability estimate using the two or more LOS probability functions.

Clause 9. The method of any of clauses 1 to 8, comprising determining a position of the UE based on the LOS probability estimate.

Clause 10. The method of any of clauses 1 to 9, comprising reporting the LOS probability estimate to the LMF.

Clause 11. A user equipment (UE), comprising a transceiver, a memory, and one or more processors communicatively coupled with the transceiver and the memory, wherein the one or more processors are configured to receive a positioning signal via a wireless link between the UE and a transmission/reception point (TRP) of a radio access network (RAN), identify a line-of-sight (LOS) probability function associated with the wireless link based on LOS probability map information provided by a location management function (LMF) of a core network for the RAN, and generate an LOS probability estimate for the wireless link using the LOS probability function.

Clause 12. The UE of clause 11, wherein the LOS probability function corresponds to an LOS probability map region associated with the wireless link, wherein the LOS probability map information indicates vertex coordinates of the LOS probability map region.

Clause 13. The UE of any of clauses 11 to 12, wherein the one or more processors are configured to obtain the LOS probability map information from a received non-access stratum (NAS) message.

Clause 14. The UE of any of clauses 11 to 12, wherein the one or more processors are configured to obtain the LOS probability map information from a received radio resource control (RRC) message.

Clause 15. The UE of any of clauses 11 to 12, wherein the one or more processors are configured to obtain the LOS probability map information from a received medium access control (MAC) control element (CE).

Clause 16. The UE of any of clauses 11 to 15, wherein the one or more processors are configured to identify the LOS probability function from among multiple LOS probability functions associated with the wireless link, wherein each of the multiple LOS probability functions corresponds to a respective one of multiple LOS probability map regions associated with the wireless link.

Clause 17. The UE of clause 16, wherein the one or more processors are configured to determine a location estimate for the UE, identify an LOS probability map region from among the multiple LOS probability map regions based on the location estimate, and identify as the LOS probability function a one of the multiple LOS probability functions that corresponds to the identified LOS probability map region.

Clause 18. The UE of clause 16, wherein the one or more processors are configured to determine a location estimate for the UE, identify two or more LOS probability map regions from among the multiple LOS probability map regions based on the location estimate, identify two or more LOS probability functions comprising a corresponding LOS probability function for each of the two or more LOS probability map regions, and generate the LOS probability estimate using the two or more LOS probability functions.

Clause 19. The UE of any of clauses 11 to 18, wherein the one or more processors are configured to determine a position of the UE based on the LOS probability estimate.

Clause 20. The UE of any of clauses 11 to 19, wherein the one or more processors are configured to report the LOS probability estimate to the LMF.

Clause 21. A method for communication by a location management function (LMF) of a core network for a radio access network (RAN), the method comprising determining, according to a line-of-sight (LOS) probability model, LOS probability map parameters for an LOS probability map region associated with a transmission/reception point (TRP) of the RAN, sending the LOS probability map parameters to a user equipment (UE) in the RAN, receiving, from the UE, feedback associated with the LOS probability map region, and training the LOS probability model based on the feedback.

Clause 22. The method of clause 21, wherein the LOS probability map parameters include vertex coordinates of the LOS probability map region.

Clause 23. The method of any of clauses 21 to 22, wherein the LOS probability map parameters include a probability function for the LOS probability map region.

Clause 24. The method of clause 23, comprising updating the probability function based on the feedback.

Clause 25. The method of clause 24, wherein the feedback indicates a location within the LOS probability map region and an LOS probability estimate for the location.

Clause 26. The method of any of clauses 21 to 25, wherein the feedback includes multipath information associated with a positioning reference signal (PRS) transmitted by the TRP.

Clause 27. The method of any of clauses 21 to 26, comprising determining a coarse location estimate for the UE, identifying the LOS probability map region based on the coarse location estimate for the UE, and sending the LOS probability map parameters for the LOS probability map region to the UE responsive to identifying the LOS probability map region.

Clause 28. The method of any of clauses 21 to 27, comprising receiving assistance data from the UE and training the LOS probability model based on the assistance data and the feedback.

Clause 29. The method of clause 28, comprising initiating a learning period for the LOS probability model and receiving the assistance data from the UE during the learning period.

Clause 30. The method of any of clauses 28 to 29, wherein the assistance data includes at least one of a port identifier (ID), a panel ID, beamforming information, UE orientation information, a receive-transmit (Rx-Tx) turn-around time, and group delay information.

Clause 31. An apparatus for a location management function (LMF) of a core network for a radio access network (RAN), the apparatus comprising at least one processor and at least one memory communicatively coupled with the at least one processor and storing processor-readable code that, when executed by the at least one processor, is configured to determine, according to a line-of-sight (LOS) probability model, LOS probability map parameters for an LOS probability map region associated with a transmission/reception point (TRP) of the RAN, send the LOS probability map parameters to a user equipment (UE) in the RAN, receive, from the UE, feedback associated with the LOS probability map region, and train the LOS probability model based on the feedback.

Clause 32. The apparatus of clause 31, wherein the LOS probability map parameters include vertex coordinates of the LOS probability map region.

Clause 33. The apparatus of any of clauses 31 to 32, wherein the LOS probability map parameters include a probability function for the LOS probability map region.

Clause 34. The apparatus of clause 33, wherein the at least one memory storing processor-readable code that, when executed by the at least one processor, is configured to update the probability function based on the feedback.

Clause 35. The apparatus of clause 34, wherein the feedback indicates a location within the LOS probability map region and an LOS probability estimate for the location.

Clause 36. The apparatus of any of clauses 31 to 35, wherein the feedback includes multipath information associated with a positioning reference signal (PRS) transmitted by the TRP.

Clause 37. The apparatus of any of clauses 31 to 36, wherein the at least one memory storing processor-readable code that, when executed by the at least one processor, is configured to determine a coarse location estimate for the UE, identify the LOS probability map region based on the coarse location estimate for the UE, and send the LOS probability map parameters for the LOS probability map region to the UE responsive to identifying the LOS probability map region.

Clause 38. The apparatus of any of clauses 31 to 37, wherein the at least one memory storing processor-readable code that, when executed by the at least one processor, is configured to receive assistance data from the UE and train the LOS probability model based on the assistance data and the feedback.

Clause 39. The apparatus of clause 38, wherein the at least one memory storing processor-readable code that, when executed by the at least one processor, is configured to initiate a learning period for the LOS probability model and receive the assistance data from the UE during the learning period.

Clause 40. The apparatus of any of clauses 38 to 39, wherein the assistance data includes at least one of a port identifier (ID), a panel ID, beamforming information, UE orientation information, a receive-transmit (Rx-Tx) turn-around time, and group delay information.

What is claimed is:

1. A method for wireless communication by a user equipment (UE), the method comprising:

receiving a positioning signal via a wireless link between the UE and a transmission/reception point (TRP) of a radio access network (RAN);

identifying a line-of-sight (LOS) probability function associated with the wireless link based on LOS probability map information provided by a location management function (LMF) of a core network for the RAN, wherein the LOS probability map information indicates coordinates defining a boundary of a LOS probability map region and parameters defining the LOS probability function for the LOS probability map region; and generating an LOS probability estimate for the wireless link using the LOS probability function, wherein the LOS probability function outputs the LOS probability estimate for the wireless link based on input comprising a given set of coordinates within the LOS probability map region.

2. The method of claim 1, wherein the LOS probability function corresponds to the LOS probability map region associated with the wireless link, wherein the coordinates defining the boundary of the LOS probability map region are vertex coordinates.

3. The method of claim 1, comprising obtaining the LOS probability map information from a received non-access stratum (NAS) message.

4. The method of claim 1, comprising obtaining the LOS probability map information from a received radio resource control (RRC) message.

5. The method of claim 1, comprising obtaining the LOS probability map information from a received medium access control (MAC) control element (CE).

6. The method of claim 1, comprising identifying the LOS probability function from among multiple LOS probability functions associated with the wireless link, wherein each of the multiple LOS probability functions corresponds to a respective one of multiple LOS probability map regions associated with the wireless link.

7. The method of claim 6, comprising:
determining a location estimate for the UE;
identifying an LOS probability map region from among the multiple LOS probability map regions based on the location estimate; and
identifying as the LOS probability function a one of the multiple LOS probability functions that corresponds to the identified LOS probability map region.

8. The method of claim 6, comprising:
determining a location estimate for the UE;
identifying two or more LOS probability map regions from among the multiple LOS probability map regions based on the location estimate;
identifying two or more LOS probability functions comprising a corresponding LOS probability function for each of the two or more LOS probability map regions; and
generating the LOS probability estimate using the two or more LOS probability functions.

9. The method of claim 1, comprising determining a position of the UE based on the LOS probability estimate.

10. The method of claim 1, comprising reporting the LOS probability estimate to the LMF.

11. A user equipment (UE), comprising:
a transceiver;
a memory; and
one or more processors communicatively coupled with the transceiver and the memory, wherein the one or more processors are configured to:
receive a positioning signal via a wireless link between the UE and a transmission/reception point (TRP) of a radio access network (RAN);
identify a line-of-sight (LOS) probability function associated with the wireless link based on LOS probability map information provided by a location management function (LMF) of a core network for the RAN, wherein the LOS probability map information indicates coordinates defining a boundary of a LOS probability map region and parameters defining the LOS probability function for the LOS probability map region; and
generate an LOS probability estimate for the wireless link using the LOS probability function, wherein the LOS probability function outputs the LOS probability estimate for the wireless link based on input comprising a given set of coordinates within the LOS probability map region.

12. The UE of claim 11, wherein the LOS probability function corresponds to the LOS probability map region associated with the wireless link, wherein the coordinates defining the boundary of the LOS probability map region are vertex coordinates.

13. The UE of claim 11, wherein the one or more processors are configured to obtain the LOS probability map information from a received non-access stratum (NAS) message.

14. The UE of claim 11, wherein the one or more processors are configured to obtain the LOS probability map information from a received radio resource control (RRC) message.

15. The UE of claim 11, wherein the one or more processors are configured to obtain the LOS probability map information from a received medium access control (MAC) control element (CE).

16. The UE of claim 11, wherein the one or more processors are configured to identify the LOS probability function from among multiple LOS probability functions associated with the wireless link, wherein each of the multiple LOS probability functions corresponds to a respective one of multiple LOS probability map regions associated with the wireless link.

17. The UE of claim 16, wherein the one or more processors are configured to:
determine a location estimate for the UE;
identify an LOS probability map region from among the multiple LOS probability map regions based on the location estimate; and
identify as the LOS probability function a one of the multiple LOS probability functions that corresponds to the identified LOS probability map region.

18. The UE of claim 16, wherein the one or more processors are configured to:
determine a location estimate for the UE;
identify two or more LOS probability map regions from among the multiple LOS probability map regions based on the location estimate;
identify two or more LOS probability functions comprising a corresponding LOS probability function for each of the two or more LOS probability map regions; and
generate the LOS probability estimate using the two or more LOS probability functions.

19. The UE of claim 11, wherein the one or more processors are configured to determine a position of the UE based on the LOS probability estimate.

20. The UE of claim 11, wherein the one or more processors are configured to report the LOS probability estimate to the LMF.

* * * * *